(12) United States Patent
Honda et al.

(10) Patent No.: US 10,861,145 B2
(45) Date of Patent: Dec. 8, 2020

(54) DEFECT INSPECTION DEVICE AND DEFECT INSPECTION METHOD

(71) Applicant: HITACHI HIGH-TECHNOLOGIES CORPORATION, Tokyo (JP)

(72) Inventors: Toshifumi Honda, Tokyo (JP); Takahiro Urano, Tokyo (JP); Hisashi Hatano, Tokyo (JP); Hironori Sakurai, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 61 days.

(21) Appl. No.: 16/329,576

(22) PCT Filed: Sep. 27, 2016

(86) PCT No.: PCT/JP2016/078331
§ 371 (c)(1),
(2) Date: Feb. 28, 2019

(87) PCT Pub. No.: WO2018/061067
PCT Pub. Date: Apr. 5, 2018

(65) Prior Publication Data
US 2019/0206047 A1    Jul. 4, 2019

(51) Int. Cl.
*G06T 7/00*     (2017.01)
*G01N 21/95*     (2006.01)
(Continued)

(52) U.S. Cl.
CPC ....... *G06T 7/0004* (2013.01); *G01N 21/8851* (2013.01); *G01N 21/9501* (2013.01);
(Continued)

(58) Field of Classification Search
None
See application file for complete search history.

(56) References Cited

U.S. PATENT DOCUMENTS 9,098,741 B1*   8/2015   Anguelov ............ G06K 9/3241
2004/0228515 A1   11/2004   Okabe et al.
(Continued)

FOREIGN PATENT DOCUMENTS

JP     2004-177139 A     6/2004
JP     2004-294358 A     10/2004
(Continued)

OTHER PUBLICATIONS

International Search Report dated Dec. 20, 2016 for the International Application No. PCT/JP2016/078331.

*Primary Examiner* — Delomia L Gilliard
(74) *Attorney, Agent, or Firm* — Volpe Koenig

(57) ABSTRACT

A defect class that can identify true information or false information regarding a defect of an inspection target is received, it is determined whether or not the number of true information and the number of false information are insufficient to set a defect extraction parameter of a predetermined region, a feature amount of the defect is extracted in a region other than the predetermined region when it is determined that the number of true information and the number of false information are insufficient, the feature amounts are totalized by adding the feature amount of the defect extracted in a region other than the predetermined region to the feature amount of the defect extracted in the predetermined region, and the totalized feature amount of the defect is displayed for adjustment of the defect extraction parameters.

9 Claims, 18 Drawing Sheets

(51) Int. Cl.
  *G01N 21/88* (2006.01)
  *G01N 21/956* (2006.01)
(52) U.S. Cl.
  CPC ... *G01N 21/956* (2013.01); *G01N 2021/8867* (2013.01); *G06T 2207/20021* (2013.01); *G06T 2207/30148* (2013.01)

(56) References Cited

U.S. PATENT DOCUMENTS

| | | | | |
|---|---|---|---|---|
| 2005/0147303 | A1* | 7/2005 | Zhou | G06K 9/6206 |
| | | | | 382/190 |
| 2007/0065014 | A1* | 3/2007 | Owechko | G06K 9/46 |
| | | | | 382/190 |
| 2008/0317329 | A1 | 12/2008 | Shibuya et al. | |
| 2011/0182496 | A1 | 7/2011 | Sakai et al. | |
| 2011/0295655 | A1* | 12/2011 | Tsuji | G06Q 10/0639 |
| | | | | 705/7.38 |
| 2012/0207381 | A1 | 8/2012 | Ong et al. | |
| 2012/0229618 | A1 | 9/2012 | Urano et al. | |
| 2017/0301093 | A1* | 10/2017 | Nakagomi | G06T 5/50 |

FOREIGN PATENT DOCUMENTS

| | | |
|---|---|---|
| JP | 2009-002743 A | 1/2009 |
| JP | 2010-048730 A | 3/2010 |
| WO | 2011/036846 A1 | 3/2011 |

* cited by examiner

[FIG. 1]
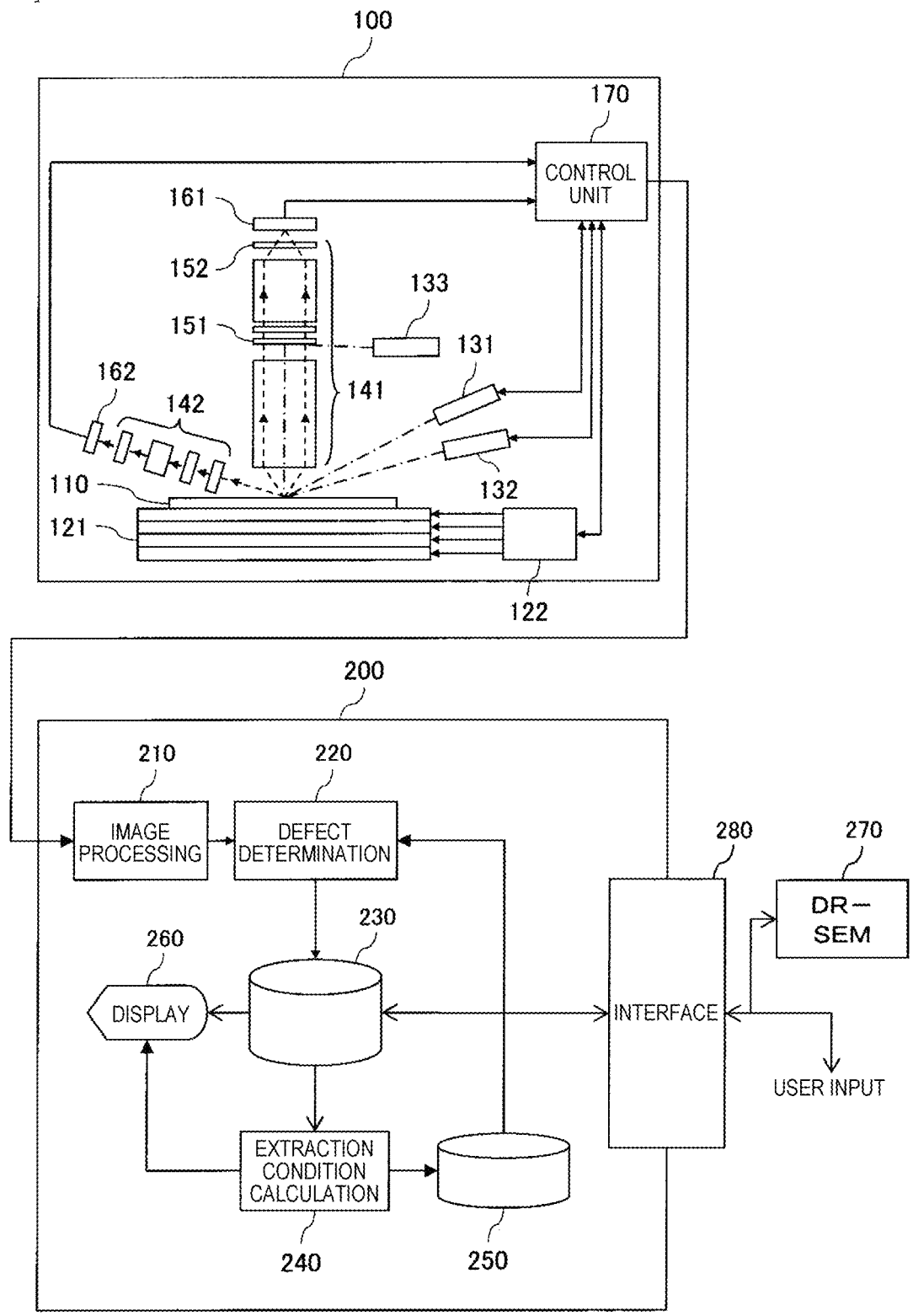

[FIG. 2]
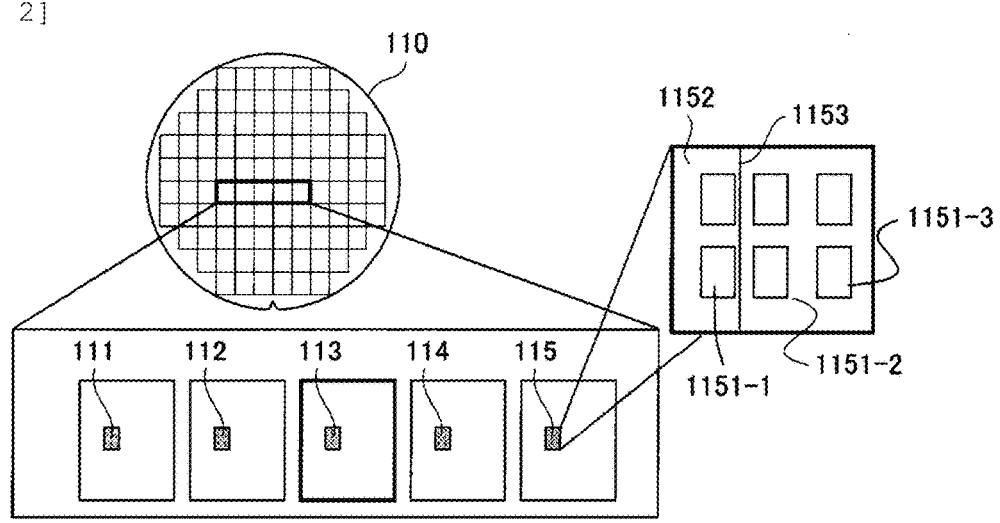
[FIG. 3]
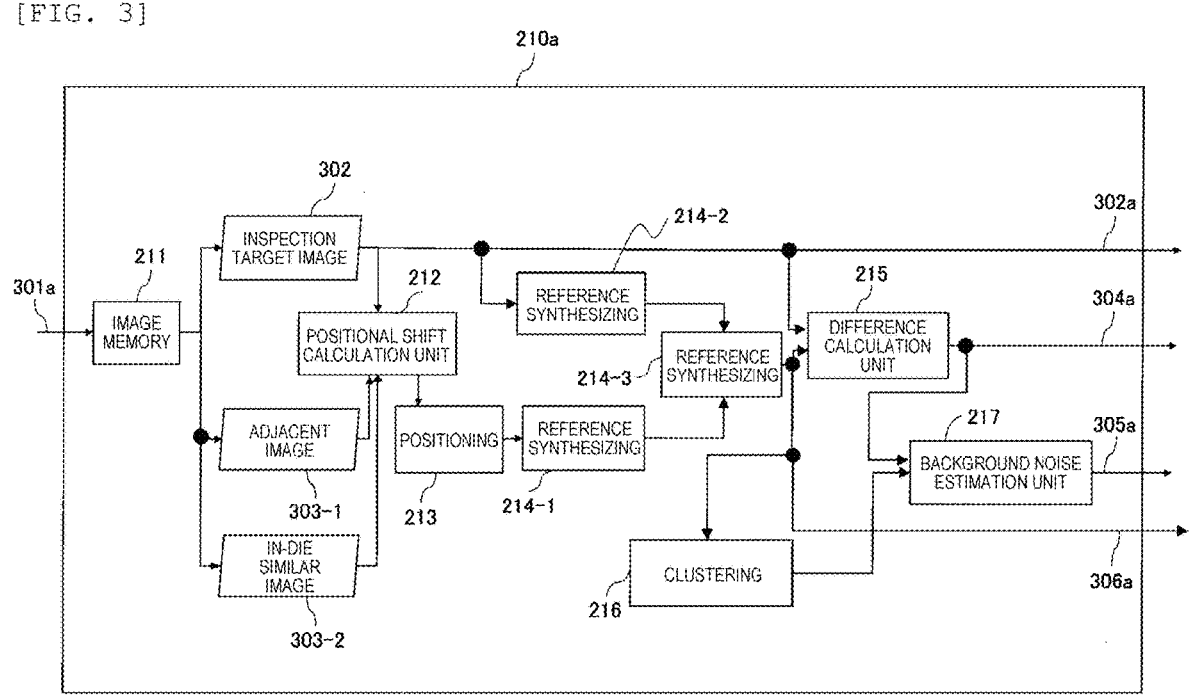

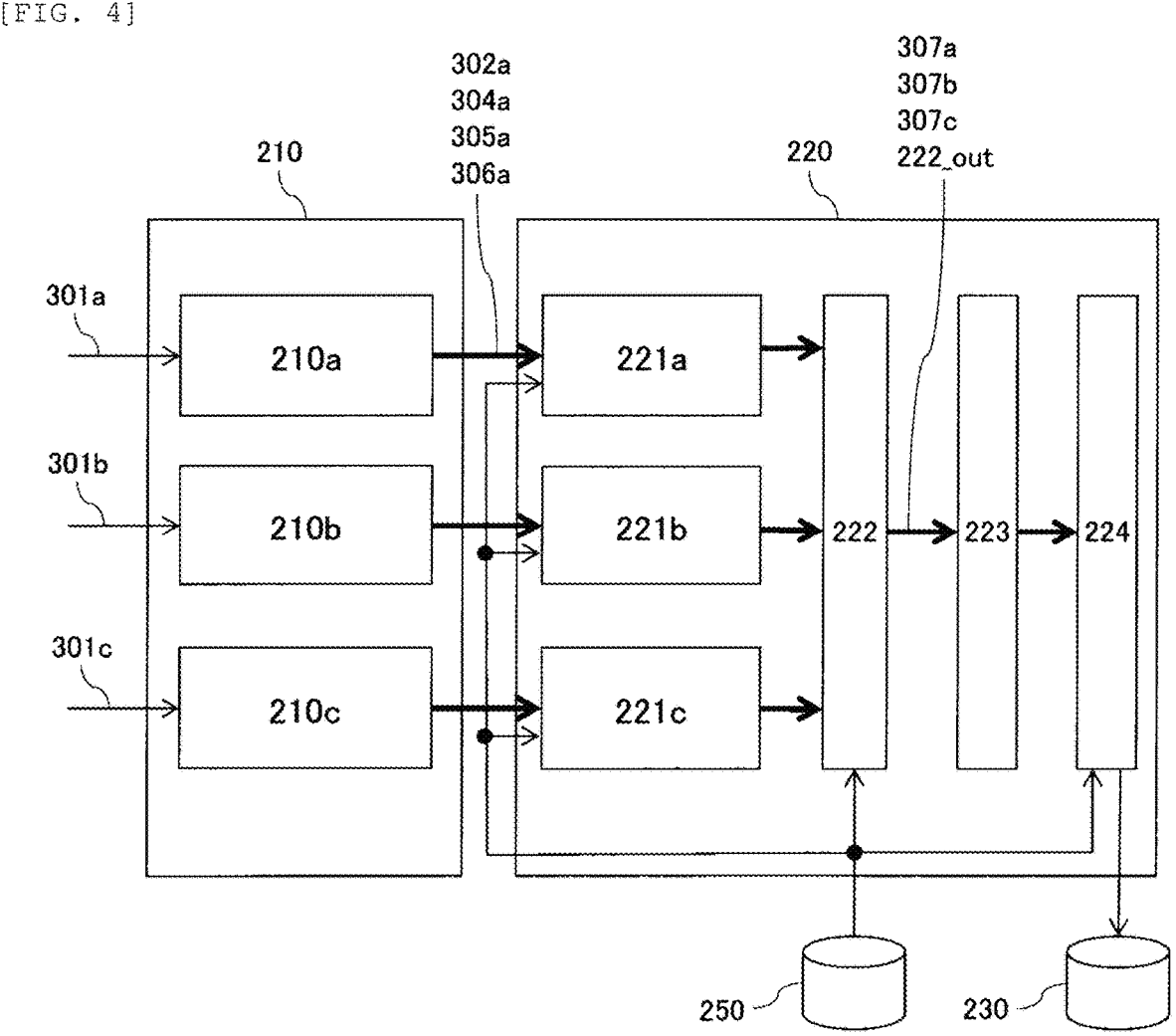
[FIG. 4]

[FIG. 5]
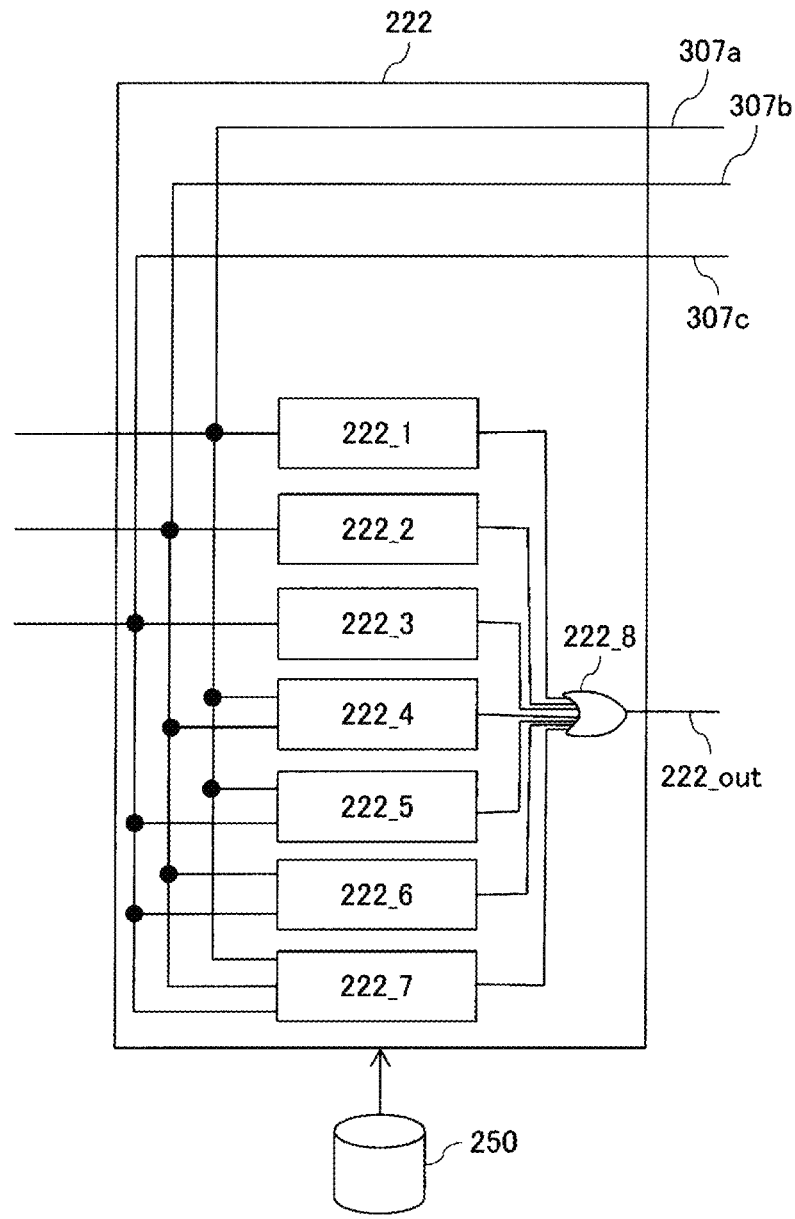

[FIG. 6]
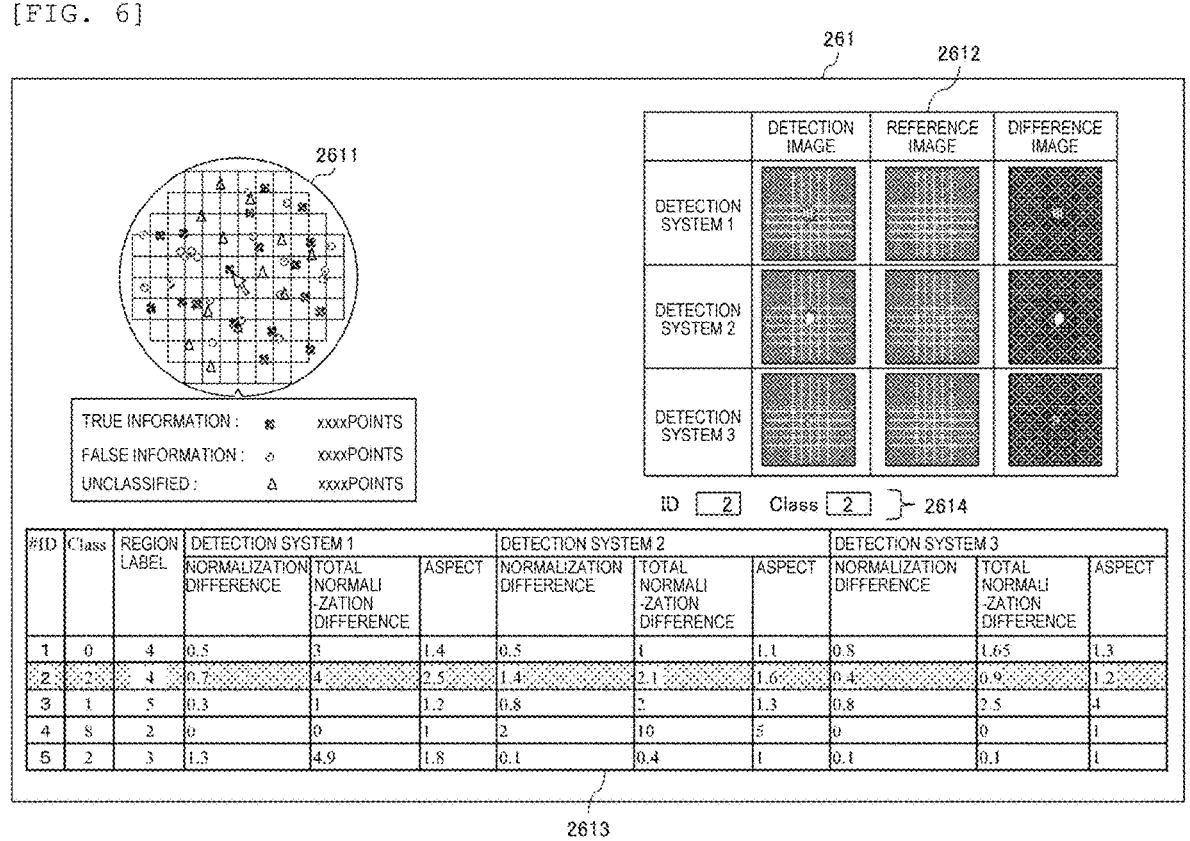

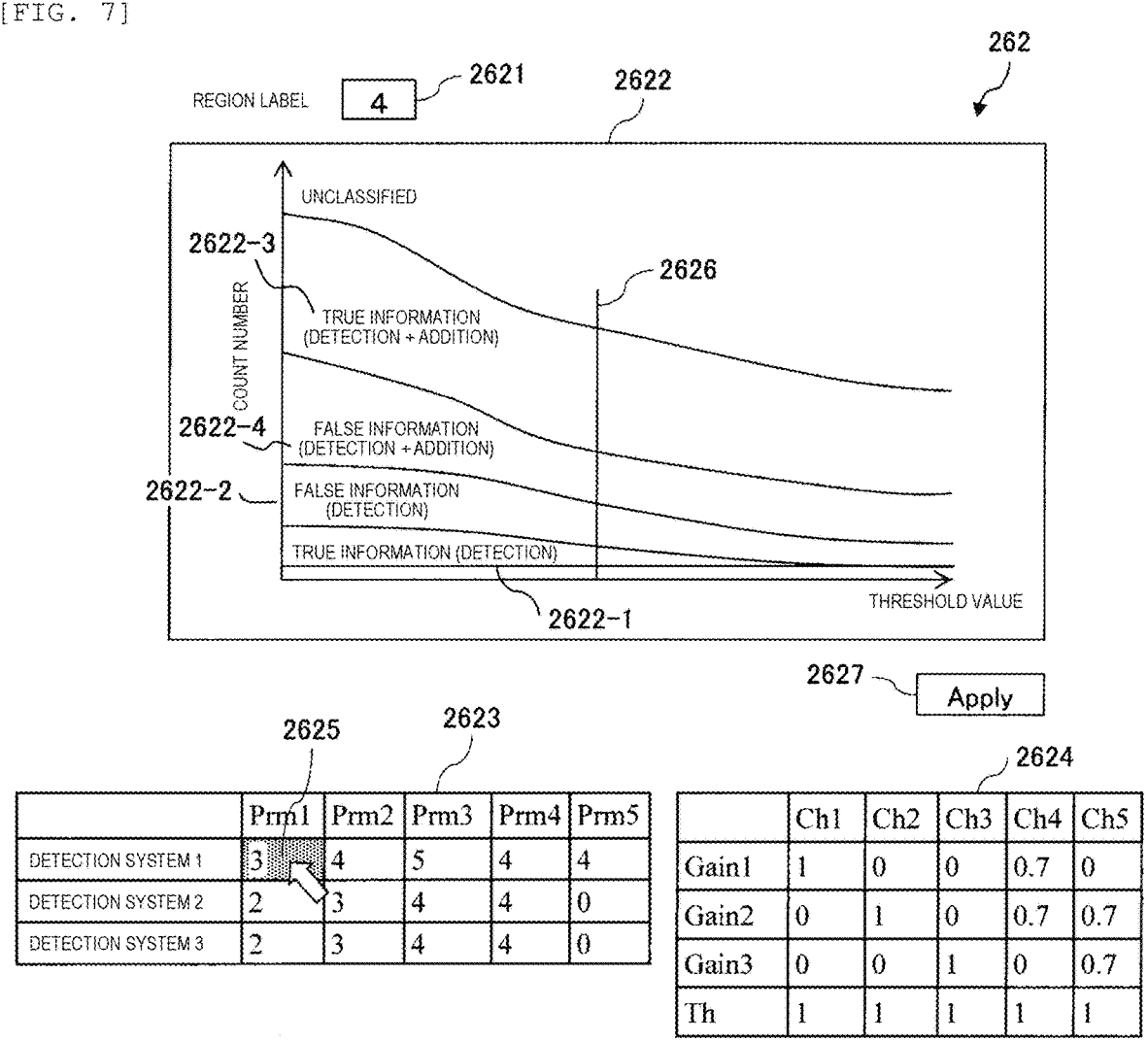
[FIG. 7]

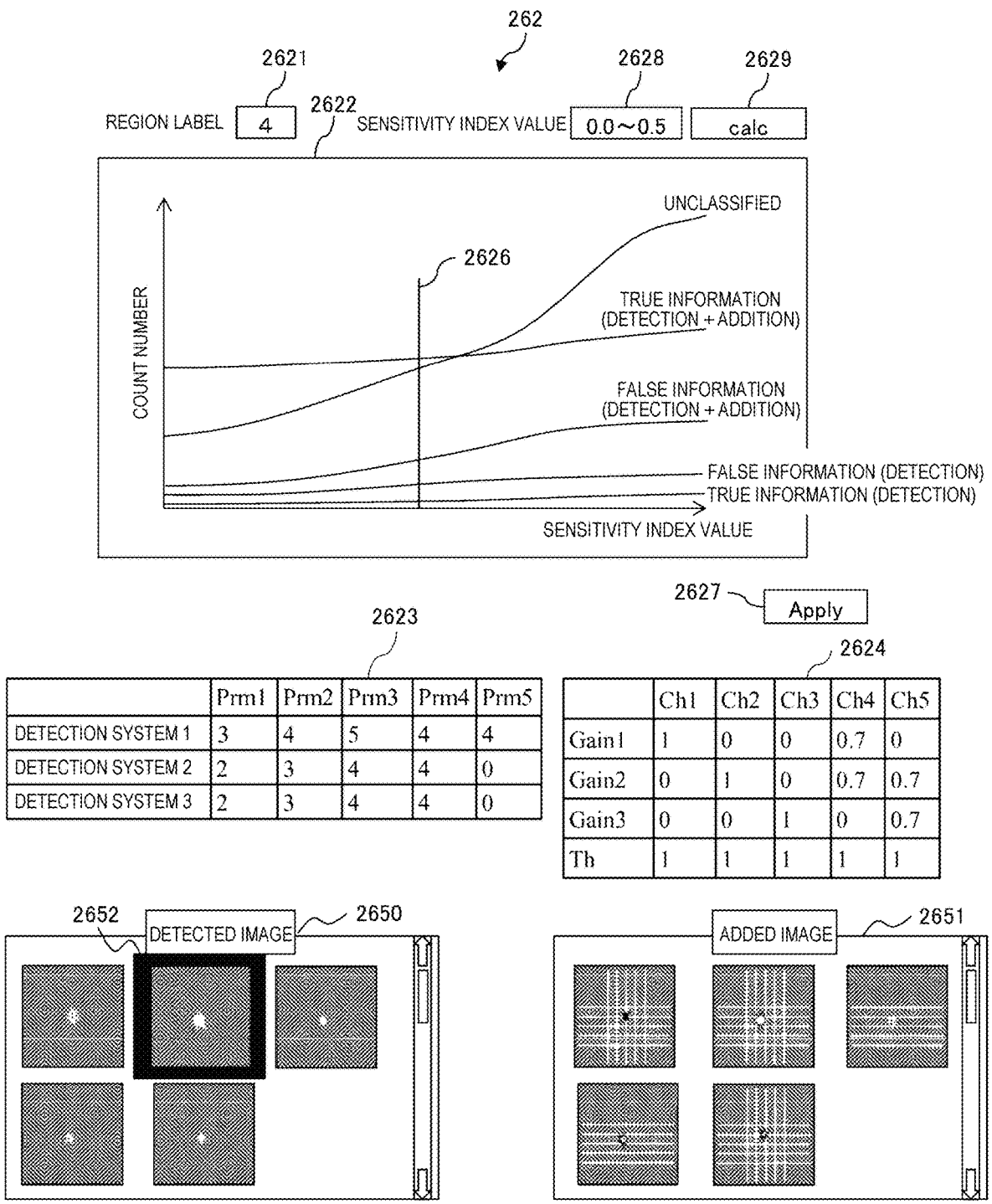

[FIG. 9]
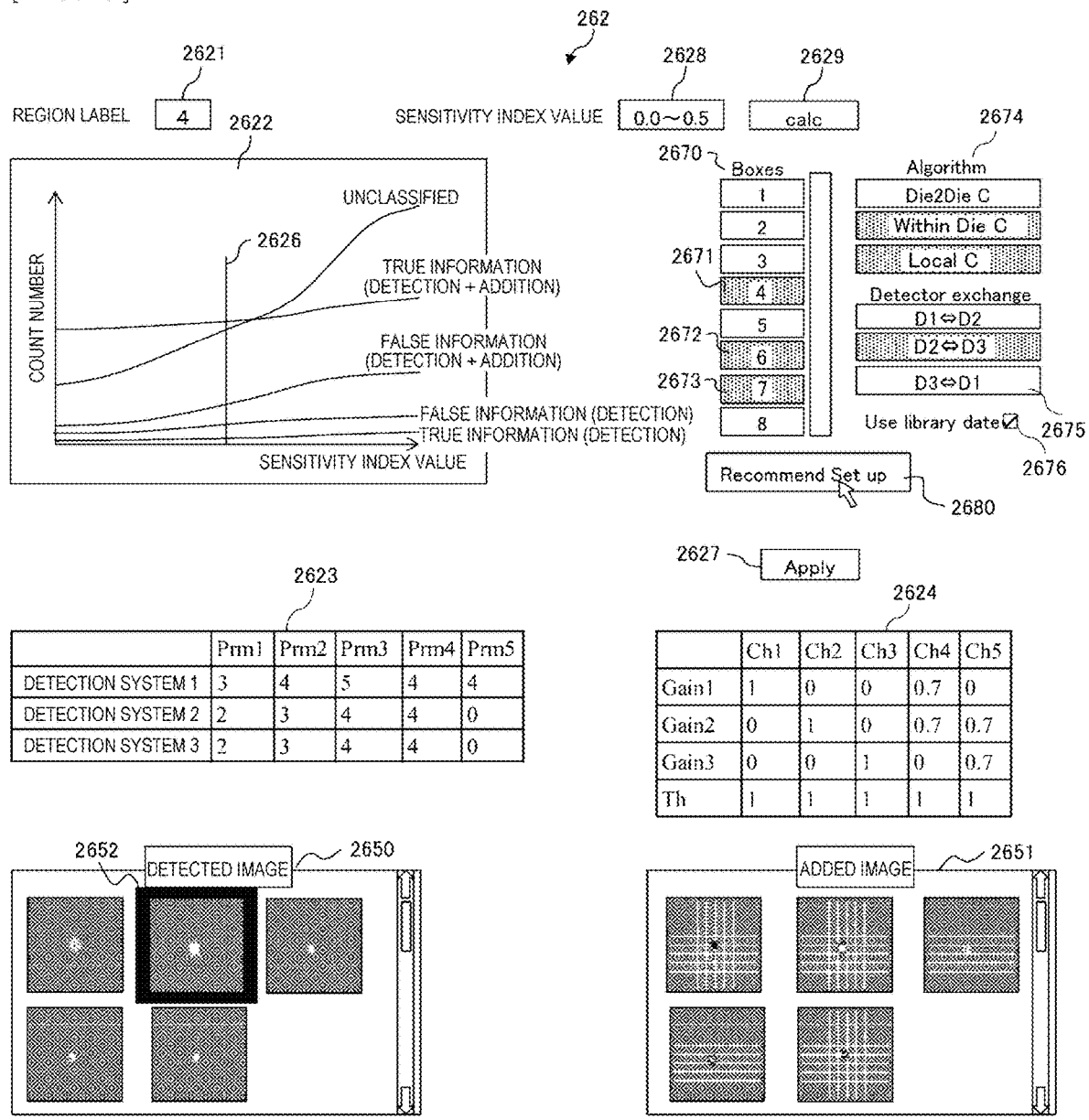

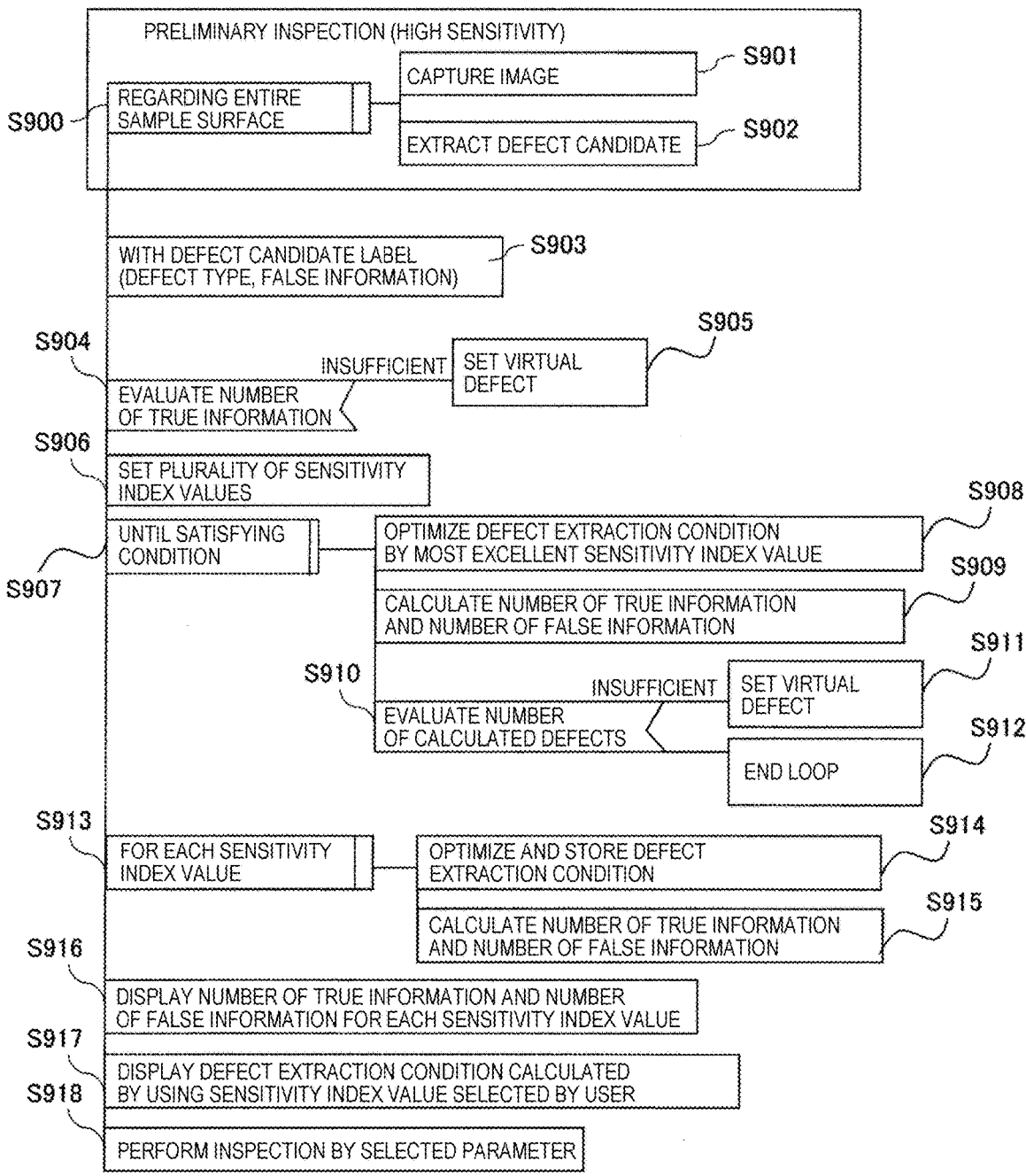
[FIG. 10]

[FIG. 11]
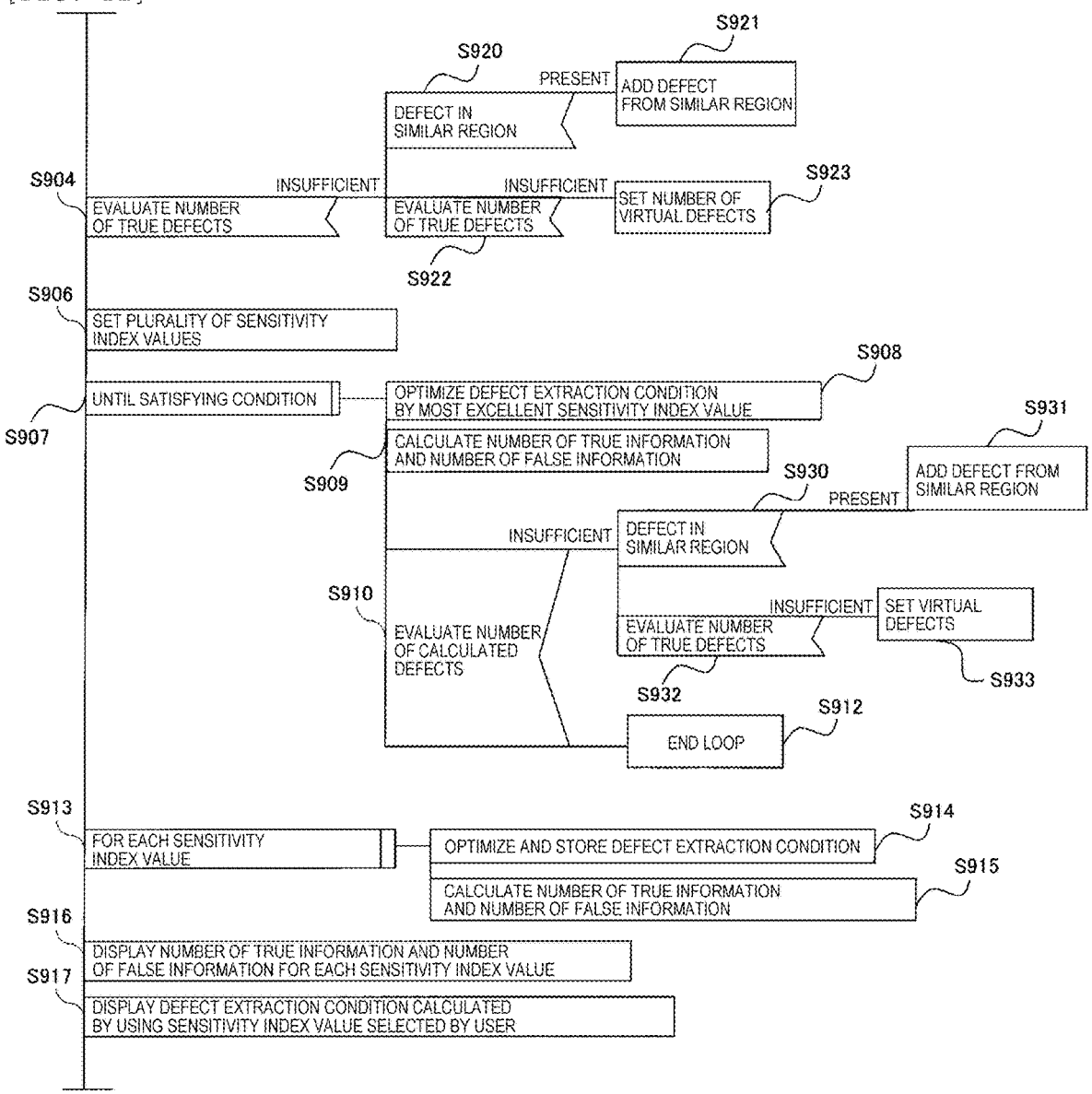

[FIG. 12]
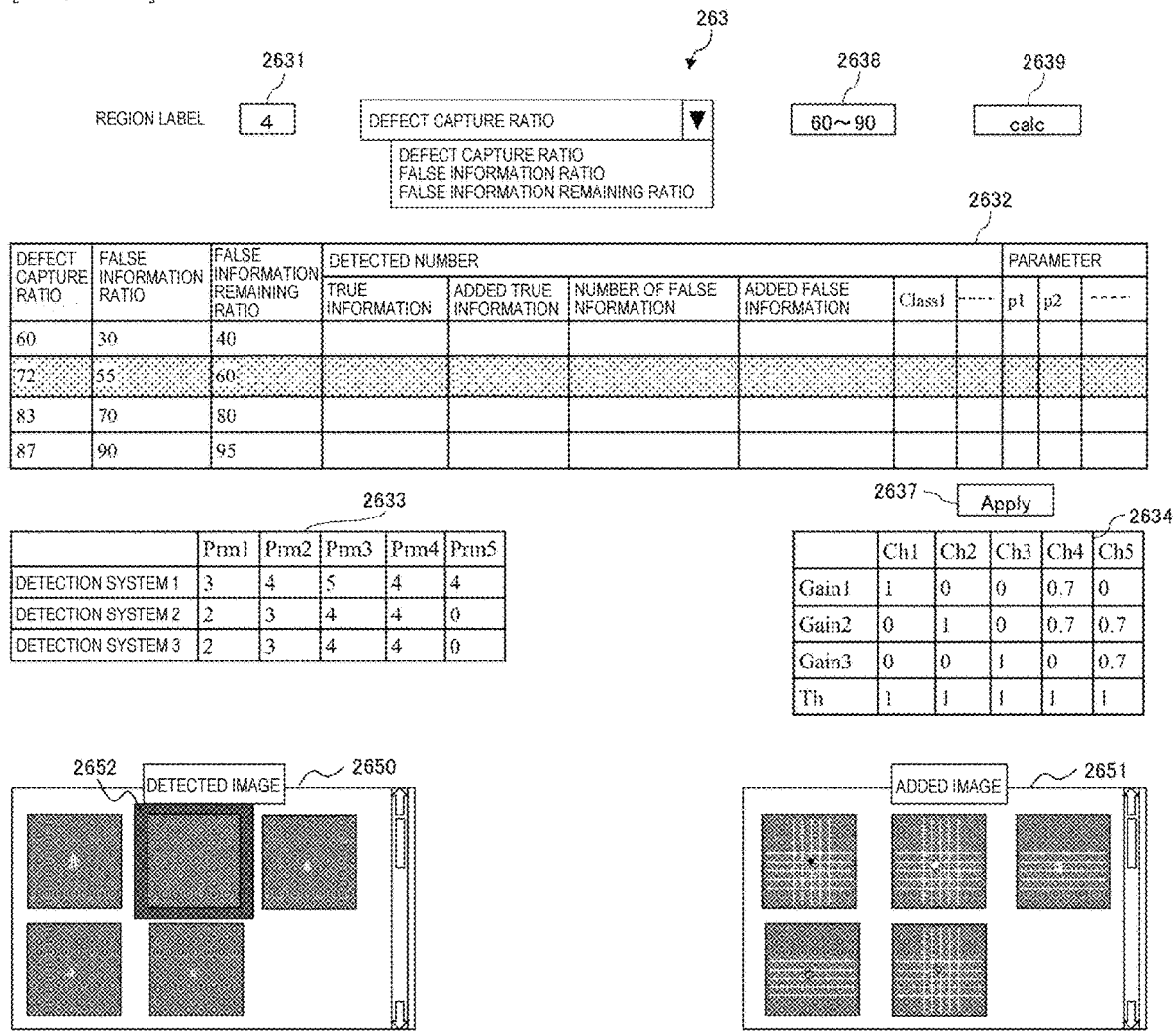

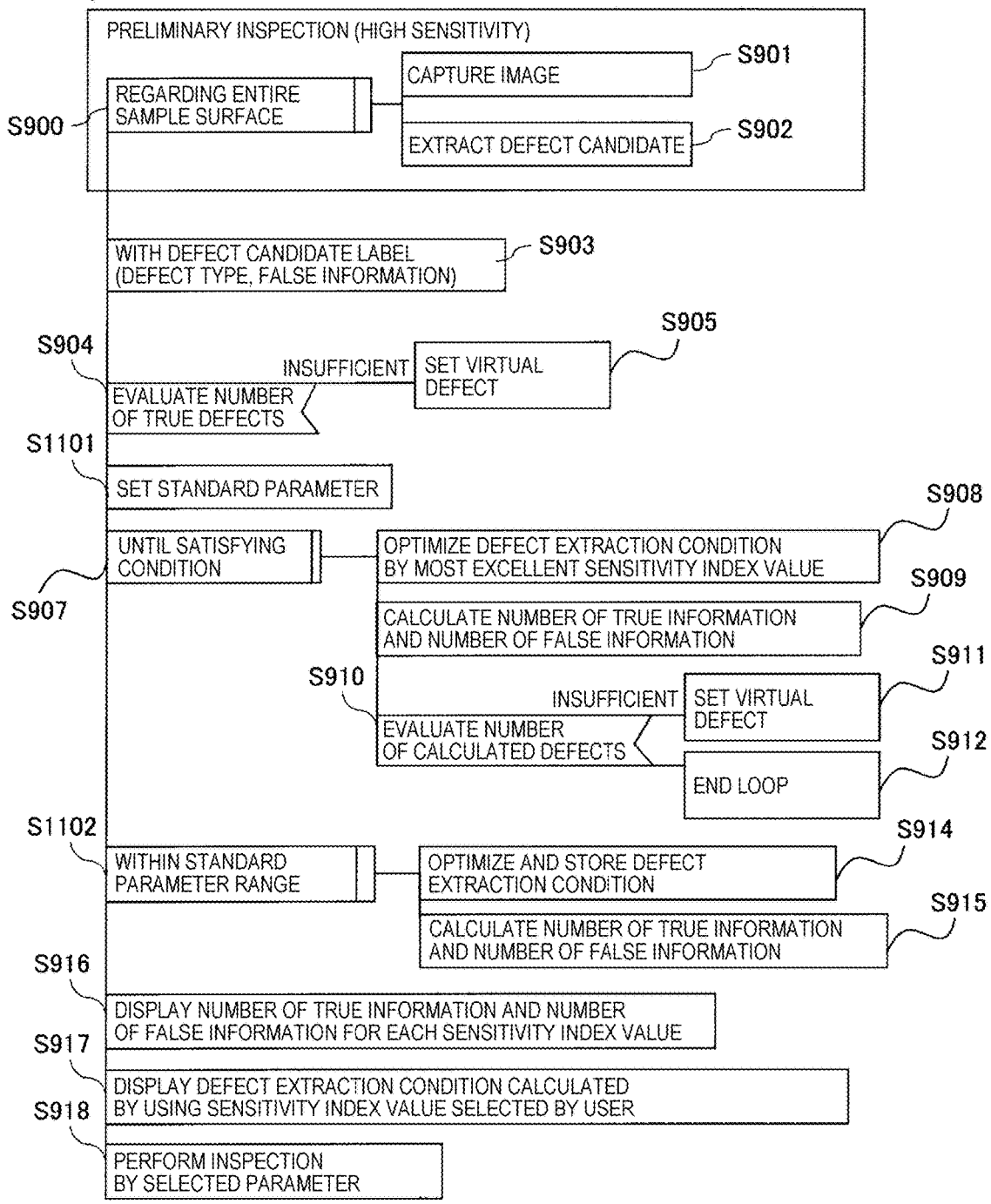
[FIG. 13]

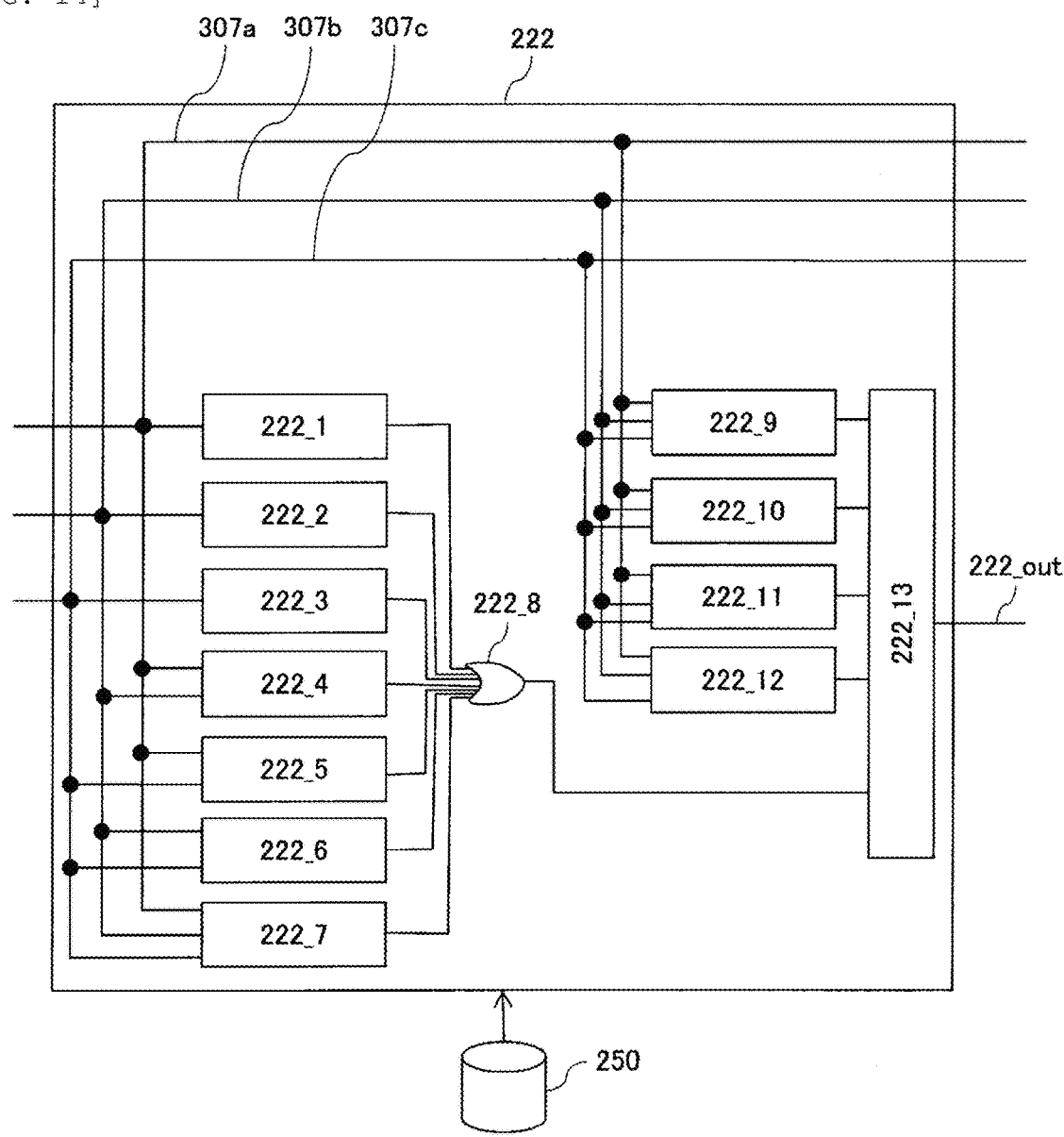
[FIG. 14]

[FIG. 15]
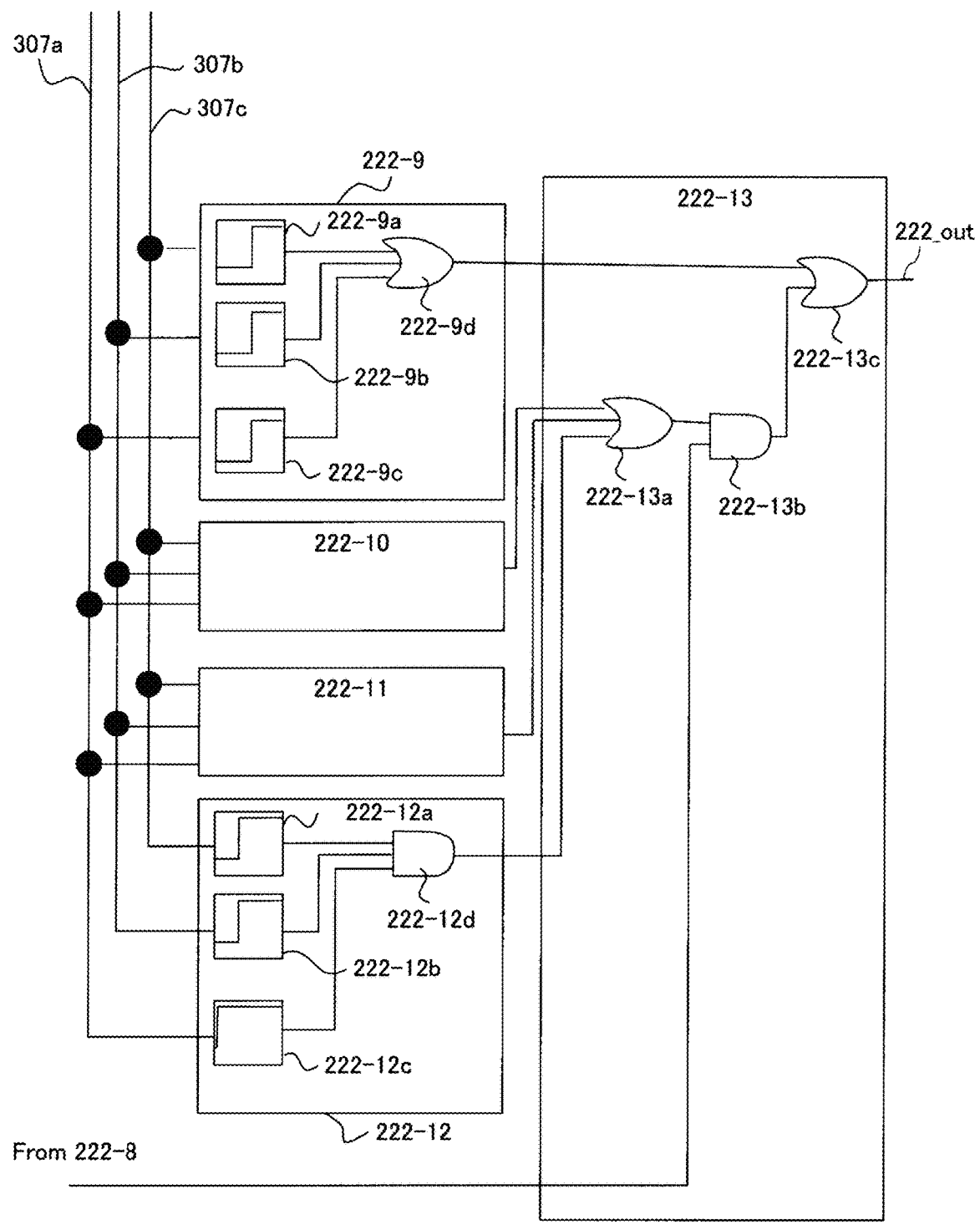

[FIG. 16]
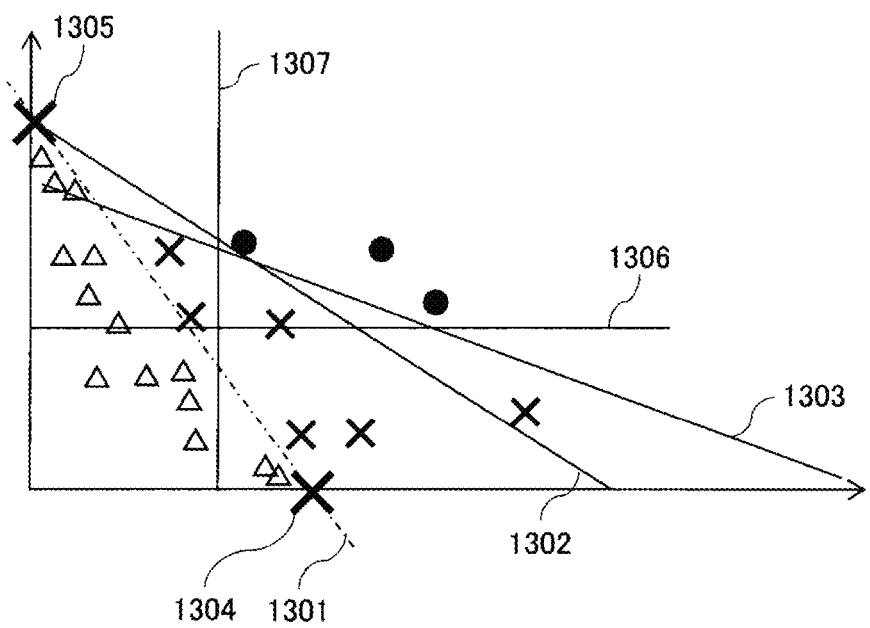

[FIG. 17]
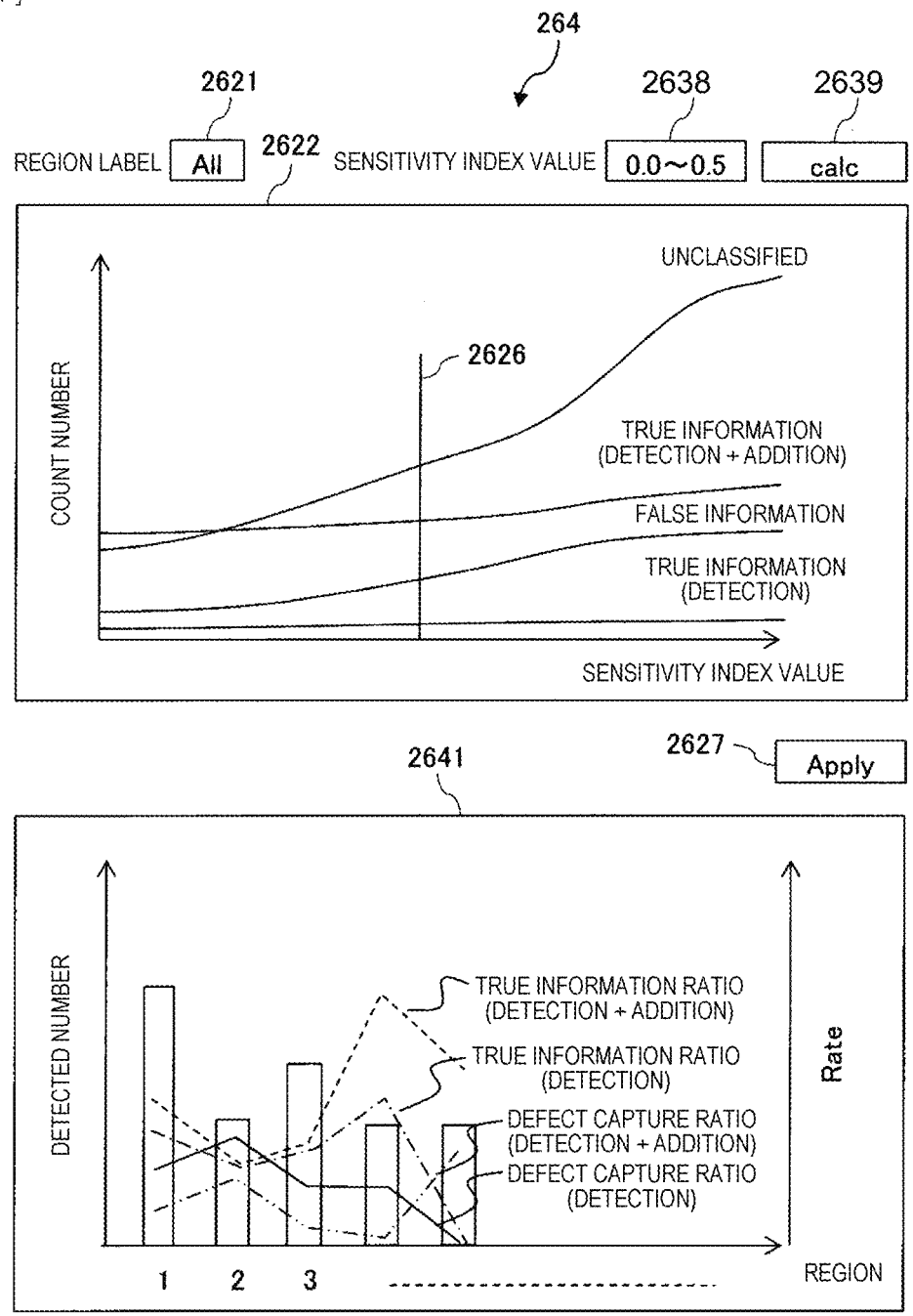

[FIG. 18]
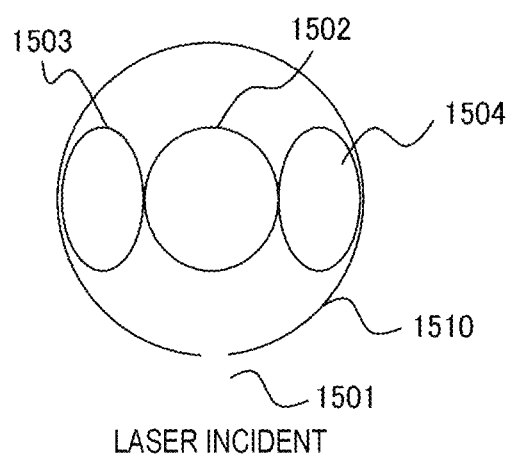
[FIG. 19]
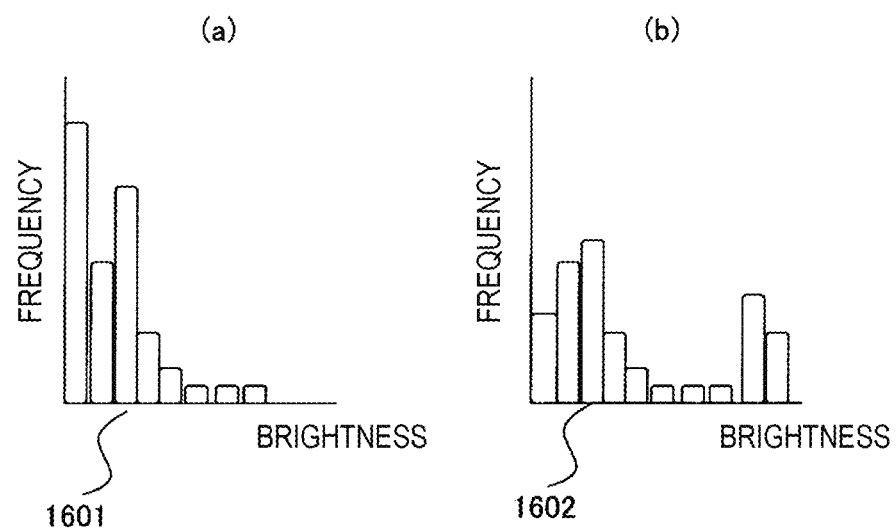

[FIG. 20]
| | MEMORY 0.5 | | | MEMORY PERIPHERAL CIRCUIT 3 | | | LOGIC |
|---|---|---|---|---|---|---|---|
| | MEMORY-A | MEMORY-B | MEMORY-C | HORIZONTAL DIRECTION | VERTICAL DIRECTION | CORNER | IN CORE |
| | D W L | D W L | D W L | D W L | D W L | D W L | D W L |
| WAFER INNER PORTION | | | | | | | |
| WAFER OUTER CIRCUMFERENCE | | | | | | | |
| PARTIAL DIE | | | | | | | |
D2D: Die-to-Die Comparison
W: Within-Die Comparison
L : Local Pattern Comparison
[FIG. 21]
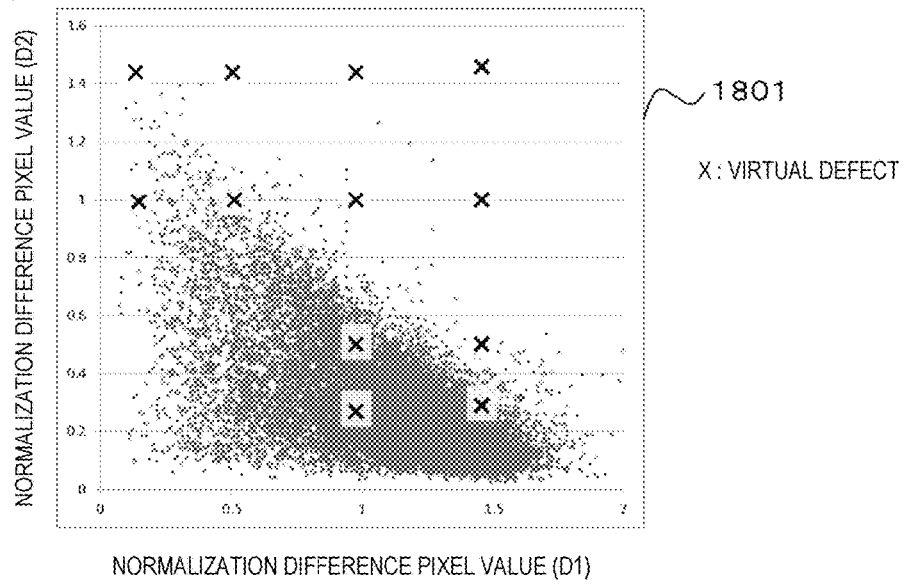
X : VIRTUAL DEFECT
NORMALIZATION DIFFERENCE PIXEL VALUE (D1)

DEFECT INSPECTION DEVICE AND DEFECT INSPECTION METHOD

TECHNICAL FIELD

The present invention relates to a defect inspection device and a defect inspection method for inspecting a defect of an inspection target.

BACKGROUND ART

In general, the detection of false information is an obstacle in improving the sensitivity of a defect inspection device. The false information is noise caused by brightness unevenness due to thin film interference on a sample surface, dimensional variations of a wiring pattern formed on the sample surface, roughness of an edge portion, and the like. Under the inspection conditions for detecting fine defects, many pieces of false information are detected at the same time. Here, it is extremely important to set the inspection conditions for detecting more defects in defect inspection while reducing the number of false information.

As a technique related to this, for example, there is JP-A-2010-48730 (PTL 1). PTL 1 discloses a method for extracting defect candidates on an object to be inspected using a threshold value surface function when setting parameters defining inspection conditions for detecting defects, and then automatically updating the parameters of the threshold value surface function based on the teaching of defect information on the extracted defect candidates.

CITATION LIST

Patent Literature

PTL 1: JP-A-2010-48730

SUMMARY OF INVENTION

Technical Problem

In PTL 1, by calculating an envelope curve that surrounds distribution of non-defective pixels taught in a feature space as the threshold value surface function and by adding the teaching of the non-defective pixels, the parameters of the threshold value surface function are updated. The user repeatedly updates the parameters of the threshold value surface function by teaching until a non-defect is no longer detected as a defect candidate. However, this method has the following problems.

Firstly, there is substantial insufficiency of the number of true information by mounting a plurality of detectors in an inspection device. In order to detect various defects, a method of performing the inspection by acquiring images of a target with a plurality of detection systems and integrating the image information is advantageous. However, as the number of detection systems increases, even when the true information exists, the true information is not always manifested by the captured images of all the detectors. It is necessary to set the detection conditions with the images acquired by all the detectors, but it is substantially not possible to set the detection conditions in the images with the true information which is not manifested. Accordingly, as the number of detection systems increases, the true information becomes insufficient, and the tendency to decrease the number of true information used to set the inspection condition increases.

Secondly, there is a problem that the defect tends to be insufficient due to the segmentation of an inspection region. For example, in a case of inspecting a sample in which various circuit patterns exist, such as on a semiconductor wafer, it is known to facilitate discrimination between the true information and the false information by optimizing the detection conditions, that is, inspection parameters or inspection algorithms, depending on the target region. In this case, since it becomes necessary to set the inspection conditions for each of the divided regions, the required number of true information increases as the number of regions increases.

Thirdly, when the target defects, such as defects on the semiconductor wafer, are near a detection limit, there is a problem that it is practically not possible to discriminate the true information and the false information from the image of the detection system mounted on the inspection device. In particular, when an optical inspection device is applied to semiconductor inspection, it is required to detect defects of several tens of nm with light having a wavelength of approximately several hundreds of nm. Accordingly, even when there is true information, it is not possible to resolve and check the defects and it is difficult to determine whether the information is true information or false information as a result. Nonetheless, in order to detect fine defects, even when the false information that is difficult to be determined is ascertained to be false information by other means, such as a defect review scanning electron microscope (SEM), it is necessary to set inspection conditions for detecting this situation.

Under the circumstances where the number of true information is insufficient as described above, as described in PTL 1, when calculating the envelope curve that surrounds the distribution of non-defective pixels as the threshold value function, the inspection sensitivity inevitably decreases.

Here, an object of the present invention is to provide a defect inspection device and a defect inspection method capable of setting parameters used for detecting defects without deterioration of inspection sensitivity even in a state where the number of true information is insufficient.

Solution to Problem

An defect inspection device according to one aspect of the present invention includes: an image generation unit that generates an appearance image of an inspection target; a feature amount calculation unit that calculates a feature amount of the appearance image; a feature amount storage unit that stores the feature amount and the appearance image; a storage unit that stores extraction condition data defining an initial value of an extraction condition for extracting a defect of the inspection target; a defect determination unit that extracts defects of the inspection target by comparing the feature amount with the extraction condition; an output unit that outputs information indicating the defect extracted by the defect determination unit; an interface unit that designates whether the defect extracted by the defect determination unit is true information or false information; a feature amount totalization unit that totalizes the feature amounts of appearance images of defects of a predetermined region of the inspection target in association with each of the true information and the false information designated by the interface unit; a defect number calculation unit that calculates an expected value of the number of defects to be detected under a specific extraction condition, based on the feature amount totalized by the feature amount totalization unit; and an expected defect number display unit that displays an expected value of the number of defects to be detected for each of true information and false information under each of a plurality of extraction conditions, in which the feature amount totalization unit determines whether or not the total number of the feature amounts of the number of true information or the number of false information is insufficient with respect to a predetermined condition based on the totalized feature amount, and adds the feature amount of the appearance image of the true information or the false information extracted out of the predetermined region when it is determined that the number of true information or the number of false information is insufficient, and the defect number calculation unit independently calculates an expected detection number of defects which is an inspection target and an expected detection number of defects which is not an inspection target.

In addition, a defect inspection method according to another aspect of the present invention includes: an image generating step of generating an appearance image of an inspection target; a feature amount calculating step of calculating a feature amount of the appearance image; a reading step of reading extraction condition data defining an initial value of an extraction condition for extracting a defect of the inspection target, from a storage unit; a defect determining step of extracting defects of the inspection target by comparing the feature amount with the extraction condition; an output step of outputting information indicating the defects extracted in the defect determining step; a defect class designating step of designating in which defect class of true information and false information the defect extracted in the defect determining step is; a designated number insufficiency determining step of determining whether or not the designated number of true information and false information extracted in a predetermined region in the defect determining step is insufficient based on the feature amount calculated in the feature amount calculating step; and a feature amount totalizing step of performing totalization by adding the feature amount of the defect that corresponds to the defect class extracted in a region other than the predetermined region to the feature amount of the defect extracted in the predetermined region when it is determined that the designated number is insufficient in the designated number insufficiency determining step.

Advantageous Effects of Invention

According to the present invention, it is possible to set parameters used for detecting defects without deterioration of inspection sensitivity even in a state where the number of true information is insufficient.

BRIEF DESCRIPTION OF DRAWINGS

FIG. 1 is a configuration view of a defect inspection device 100 according to Example 1 of the present invention.

FIG. 2 is a top view illustrating an example of a sample 110.

FIG. 3 is a configuration view of an internal computing block included in an image processing unit 210.

FIG. 4 is a block diagram illustrating an internal configuration of a defect determination unit 220.

FIG. 5 is a block diagram illustrating an internal configuration of a space classifier 222.

FIG. 6 is an example of a defect candidate screen 261 displayed by a display unit 260.

FIG. 7 is an example of a setting screen 262 used by a user to adjust defect extraction parameters.

FIG. 8 is an example of the setting screen 262 used by the user to adjust defect detection parameters.

FIG. 9 is an example of the setting screen 262 used by the user to adjust defect detection parameters.

FIG. 10 is a diagram illustrating a procedure in which a processing device 200 adjusts defect extraction parameters.

FIG. 11 is a diagram illustrating a procedure in which the processing device 200 adjusts defect extraction parameters.

FIG. 12 is an example of a setting screen 263 used by a user to adjust defect extraction parameters according to Example 2 of the present invention.

FIG. 13 is a diagram illustrating a procedure in which the processing device 200 adjusts defect extraction parameters.

FIG. 14 is an example of a block diagram illustrating an internal configuration of the space classifier 222 in Example 3 of the present invention.

FIG. 15 is an example of a block diagram illustrating an internal configuration of the space classifier 222 in Example 3 of the present invention.

FIG. 16 is a conceptual diagram illustrating an aspect in which the space classifier 222 in Example 3 of the present invention separates defects and noise.

FIG. 17 is an example of a setting screen 264 used by a user to adjust defect detection parameters in Example 4 of the present invention.

FIG. 18 is an explanatory view of a layout diagram of an opening of a detection system of an optical system.

FIG. 19 is an explanatory diagram of a brightness histogram for calculating similarity for each partial region.

FIG. 20 is an explanatory diagram for calculating a distance between partial regions based on design data.

FIG. 21 is an explanatory diagram for setting a virtual defect feature amount in a feature space.

DESCRIPTION OF EMBODIMENTS

Hereinafter, examples of the present invention will be described in detail with reference to the drawings.

Example 1

FIG. 1 is a configuration view of a defect inspection device 100 according to Example 1 of the present invention.

The defect inspection device 100 is a device that images an appearance image of a sample 110 and inspects defects of the sample 110 using the appearance image. For the convenience of description, the defect inspection device 100 and a computing device 200 are separately described below, but the defect inspection device 100 and the computing device 200 may be integrally formed or may be interconnected via an appropriate communication line.

The sample 110 is an object to be inspected, such as a semiconductor wafer. A stage 121 can mount the sample 110 thereon, move the sample 110 in the XYZ directions, and rotate the sample 110. A mechanical controller 122 is a controller for driving the stage 121. Either illumination optical system 131 or 132 irradiates the sample 110 with illumination light obliquely. An upper detection system 141 and an oblique detection system 142 form an image with the scattered light from the sample 110. The image sensors 161 and 162 receive optical images formed by each of the detection systems and convert the images into image signals. An analyzer 152 is disposed in front of the image sensor 161. By detecting the scattered light while moving the stage 121 in a horizontal direction, it is possible to obtain a two-dimensional image of the sample 110.

As a light source of the illumination optical systems 131 and 132, a laser or a lamp may be used. The wavelength of each of the light sources may be a single wavelength or a broadband wavelength light (white light). In a case of using a short wavelength light, ultraviolet light can also be used to increase the resolution of the image to be detected (to detect a fine defect). In a case of using a laser as the light source, the illumination optical systems 131 and 132 can also be provided with means for reducing the coherence as long as the laser is a single wavelength laser.

The illumination optical system 133 irradiates the sample 110 via an objective lens of the upper detection system 141. It is possible to change the optical path using a folding mirror (not illustrated) at a position of a space filter 151 and irradiate the sample 110 with the illumination light from the illumination optical system 133. Furthermore, by disposing a wavelength plate (not illustrated) between each of the illumination optical systems 131 to 133 and the sample 110, it is possible to change a polarization state of the illumination light incident on the sample 110.

A control unit 170 controls the overall operation of the defect inspection device 100, such as the mechanical controller 122, each illumination optical system, and each image sensor. The processing device 200 can be connected to the defect inspection device 100 via the control unit 170. The processing device 200 can control the defect inspection device 100 via the control unit 170.

The processing device 200 includes an image processing unit 210, a defect determination unit 220, an image storage unit 230, an extraction condition calculation unit 240, an extraction condition storage unit 250, and a display unit 260. A DR-SEM 270 may be configured as a function of the computing device 200, or may be configured as a functional unit different from the processing device 200. Each of the functional units is a function implemented by executing a program by a memory in a processor and the processor.

The image processing unit 210 acquires an appearance image of the sample 110 via the control unit 170, and executes the processing which will be described later in FIG. 3. The defect determination unit 220 extracts the defect of the sample 110 based on a feature amount of the appearance image according to the extraction condition described by extraction condition data stored in the extraction condition storage unit 250. The image storage unit 230 stores a feature amount image indicating the feature amount of the sample 110, a determination result by the defect determination unit 220, and the like. The extraction condition calculation unit 240 calculates a new defect extraction condition according to a procedure described later, and the defect determination unit 220 extracts the defect using the defect extraction condition. The display unit 260 displays the processing result of the processing device 200, such as the determination result by the defect determination unit 220, on a screen. A defect review scanning electron microscope (SEM) (DR-SEM) is a device for inspecting the defect of the sample 110 using an SEM image and is configured as defect inspecting means different from the defect inspection device 100.

FIG. 2 is a top view illustrating an example of the sample 110. If the sample 110 is, for example, a semiconductor wafer, the same semiconductor chips (dies) 111 to 115 are formed on the sample 110. On the semiconductor chip 115, memory areas 1151-1, 1151-2 and 1151-3 and a peripheral circuit area 1152 are formed. The defect inspection device 100 acquires the appearance image while moving the stage 121 in a direction orthogonal to an illumination line (scanning line) 1153. The processing device 200 extracts the defects by comparing the semiconductor chips 111 to 115 with each other. Details will be described later.

FIG. 3 is a configuration view of an internal computing block included in the image processing unit 210. As will be described later with reference to FIG. 4, the image processing unit 210 includes an internal computing block for each detection system included in the defect inspection device 100, and separately processes the appearance images detected by each of the detection systems. Here, an internal computing block 210a for processing the appearance image detected by a first detection system (for example, the upper detection system. 141) is illustrated as an example. Since the other internal computing blocks also have the same configuration, when it is necessary to distinguish the internal computing blocks from each other, the subscript of the alphabet will be used. This also applies to the drawings which will be described later.

The internal computing block 210a receives a pixel value 301a of the appearance image of the sample 110 and stores the pixel value 301a in an image memory 211, thereby generating an inspection target image (for example, the semiconductor chip 111) 302. Similarly, a comparison target image is generated. As the comparison target image, an adjacent image (for example, semiconductor chips 112 to 115) 303-1 or an in-same-die similar image 303-2 (for example, memory circuit portions 1151-1 to 1151-3 having the same design formed in the same semiconductor chip) is generated. Since the distance between the in-die similar image and the inspection target is close, an image can be expected to be more similar to the inspection target. Therefore, when the in-same-die similar image similar to the detection target region is obtained, 303-2 is used as the comparison target image, and in a region where there is no 303-2, 303-1 is used as the comparison target image.

A positional shift calculation unit 212 calculates a positional shift amount between both images by calculating a normalization correlation between the inspection target image 302 and the adjacent image 303, for example. A positioning unit 213 aligns the positions of both images by moving the inspection target image 302 or the adjacent image 303 according to the positional shift amount. A reference image synthesizer 214-1 generates a reference image 306 configured of, for example, median values of pixel values (luminance values) of the plurality of adjacent images 303. The reference image 306 is an image that serves as a reference for the defect inspection. Meanwhile, an independent reference image synthesizer 214-2 synthesizes a reference image using only the inspection target image 302. For example, in the semiconductor chip, there are many cases where the same pattern is repeated locally, and by using the repetition of the same pattern, a reference image is synthesized by taking the median value of the luminance value.

Otherwise, when the pattern is extremely fine with respect to the resolution of the detection system, an image having a uniform brightness obtained by taking the median value of the region of the unresolved image may be used as a reference image. As an example thereof, there is a line pattern or a memory cell portion having a wiring pitch of several tens nm. In a case of using a UV laser as a illumination light source of 131 and 132, since the wavelength size is 200 nm or longer, the line pattern or the memory cell portion having a pitch of several tens nm cannot be resolved, and is imaged as a uniform region which is generally extremely dark. 214-3 synthesizes the final reference image based on the reference images output by

214-1 and 214-2. When the reference image can be synthesized in the vicinity of the inspection target, the most appropriate approximate image can be obtained as a normal portion of the inspection target, and thus, the output of 214-2 is applied as a reference image, and when the most appropriate approximate image cannot be obtained, 214-1 is applied as a reference image. In addition, although not illustrated, both of the outputs may be applied as reference images, and comparison imaging processing may be performed twice with different reference images for one inspection target image. A difference calculation unit 215 calculates a difference between the inspection target image 302 and the reference image 306 to create a difference image 304.

Based on a pixel value of the reference image 306 and a slope of the pixel value (dI(x, y)/dx, dI(x, y)/dy), a clustering unit 216 performs clustering with respect to a partial region in the reference image 306 into one or more groups. Accordingly, the partial region in the reference image 306 is classified into, for example, (a) a group having a large pixel value (bright), (b) a group having a medium pixel value, (c) a group having a small pixel value (dark), and the like. In the process of calculating the difference between the inspection target image 302 and the reference image 306, the difference calculation unit 215 creates a histogram obtained by totalizing the difference value and the frequency thereof for each of the groups. For example, how far the pixel value belonging to the group (a) is away from the pixel value of the reference image 306 is totalized, and the correspondence relationship between the difference value and the frequency is recorded as a histogram.

A background noise estimation unit 217 calculates a value indicating how much the pixel value of the difference image 304 calculated by the difference calculation unit 215 varies. The value is called background noise. When the reference image 306 and the inspection target image 302 are the same, there is no difference, and thus, the variation is 0. When the difference values between both of the images are various (when difference values having various values are present), the difference between the inspection target image 302 and the reference image 306 is considered to be large. The background noise estimation unit 217 obtains a standard deviation of the histogram calculated by the difference calculation unit 215 and uses the standard deviation as first background noise. The first background noise has a significance of indicating the variation for each group.

Furthermore, the background noise estimation unit 217 calculates second background noise based on the variation (for example, standard deviation) of the pixel value at the same location in the plurality of adjacent images 303. The second background noise has a significance of indicating the variation for each pixel.

The internal computing block 210a outputs an inspection target image 302a and a reference image 306a. The difference calculation unit 215 generates and outputs the difference image 304 by disposing the calculated difference in correspondence with each pixel position. The background noise estimation unit 217 generates and outputs a background noise image 305 in which the two components of the calculated first background noise and second background noise are disposed in correspondence with each pixel position.

FIG. 4 is a block diagram illustrating an internal configuration of the defect determination unit 220. The image processing unit 210 includes an internal computing block (210a to 210c are illustrated on the assumption that there are three detection systems in FIG. 4) for each detection system. Each internal computing block respectively performs the processing described in FIG. 3 and delivers the respective outputs to corresponding normalization units 221a to 221c.

The normalization unit 221 synthesizes the components configuring each pixel of the background noise image, the first background noise, and the second background noise, and calculates synthetic background noise at the pixel position. Parameters indicating a calculation formula are stored in the extraction condition storage unit 250, and the data is used. Otherwise, a prescribed calculation formula, such as an average value, may be used. By dividing each pixel of the difference image 304 by the calculated synthetic background noise image, a normalization difference image obtained by normalizing each pixel value of the difference image 304 is calculated.

The space classifier 222 disposes the pixel of the normalized difference 304 in a pixel value space having each detection system as a space shaft and extracts defect candidates based on the distance between each pixel and the origin. Pixels of which the distance to the origin exceeds a threshold value are regarded as defect candidates. The threshold value can be stored in advance in the extraction condition storage unit 250, for example. The threshold value can also be adjusted as a parameter of the defect inspection device 100. A configuration example of the space classifier 222 will be described again in FIG. 5 which will be described later.

The feature extraction unit 223 calculates the defect feature amount by analyzing the inspection target images 302a to 302c and the reference images 306a to 306c for the defect candidate extracted by the space classifier 222. For example, as the defect feature amount, (a) a shape feature of a defect candidate region (ratio of long diameter/short diameter by ellipse approximation), (b) sum of normalization differences in the defect candidate region, and (c) a result difference obtained by applying a Laplacian filter to each of the inspection target image 302 and the reference image 306 can be used. The defect candidate region is a partial region formed by a set of pixels determined to be defects. Other feature amounts can also be used.

The determination unit 224 separates the defects and the false information according to the description of the extraction condition data stored in the extraction condition storage unit 250 in a multidimensional space in which the normalization difference for each detection system calculated by the normalization unit 221 and each feature amount calculated by the feature extraction unit 223 are respectively provided as space shafts. The determination unit 224 stores the image of the defect candidate determined to be a defect and the feature amount of the defect candidate in the image storage unit 230.

FIG. 5 is a block diagram illustrating an internal configuration of the space classifier 222. The space classifier 222 receives each pixel value of the normalized background noise image 305 output by the normalization unit 221 for each detection system (normalization difference pixel values 307a to 307c).

Linear sum calculators 222_1 to 222_3 respectively receive the normalization difference pixel values 307a to 307c, and multiply the normalization difference pixel values by a predetermined gain (coefficient). When the calculation result exceeds the predetermined threshold value, an output indicating that the calculation result exceeds the predetermined threshold value is output to a logical sum unit 222_8. The threshold value and the coefficient can be stored in advance in the extraction condition storage unit 250 and further can be adjusted as a defect extraction parameter. The same applies to the other linear sum calculators.

Linear sum calculators 222_4 to 222_6 receive pairs of normalization difference pixel values 307a and 307b, 307a and 307c, and 307b and 307c, respectively, add the values by multiplying each normalization difference pixel value by a predetermined coefficient, and accordingly obtain the linear sum. When the calculation result exceeds the predetermined threshold value, an output indicating that the calculation result exceeds the predetermined threshold value is output to the logical sum unit 222_8.

The linear sum calculator 222_7 receives normalization difference pixel values 307a to 307c, adds the values by multiplying each normalization difference pixel value by a predetermined coefficient, and accordingly obtains the linear sum. When the calculation result exceeds the predetermined threshold value, an output indicating that the calculation result exceeds the predetermined threshold value is output to the logical sum unit 222_8.

In a case of receiving an output indicating that the calculation result exceeds the threshold value from any one of the linear sum calculators 222_1 to 222_7, the logical sum unit 222_8 outputs an output indicating that the pixel is a defect as a determination result 222_out. When the calculation result is equal to or smaller than the threshold value in all of the logical sum units, the logical sum unit 222_8 outputs an output indicating that the corresponding pixel is not a defect. By performing the processing with respect to all the pixels, bit map data indicating whether or not each pixel is a defect is obtained.

FIG. 6 is one example of a defect candidate screen 261 displayed by a display unit 260.

A defect map 2611 displays the positions of the defect candidates determined by the determining unit 224 as defects on a top view of the sample 110. A defect candidate image 2612 displays each of the detection target image 302, the reference image 306, and the difference image 304 for each defect candidate on the defect map 2611 designated (for example, clicked with the arrow pointer) by the user. When the appearance images of the sample 110 are acquired using a plurality of detection systems, the images are respectively displayed for each detection system. A defect candidate list 2613 displays the details of each defect candidate displayed on the defect map 2611.

The defect candidate list 2613 displays identifier (ID), defect classification (Class), region label, defect feature amount of the defect candidates. The ID is given for convenience in order to distinguish each defect candidate. The defect classification is a blank in an initial state. As the user checks the defect candidate image 2612, it is determined whether the defect candidate is true information or false information, and a classification number indicating the result is input to the column (for example, in a case of the false information, classification=1 and the like is input). In the number column under the defect map 2611, the number of defect candidates classified by the user and the number of unclassified defect candidates are respectively displayed. The region label is an identifier indicating the partial region of the sample 110, and for example, the memory area 1151 described in FIG. 2 corresponds thereto. The defect feature amount is a feature amount of the defect candidate extracted by each detection system. The user repeatedly selects defect candidates randomly on the defect map 2611 and inputs classifications, for example, until both the number of true information and the number of false information reach a certain number of cases.

In a case of designating and desiring to display a specific ID or classification on the screen, the user inputs the numerical value to a search condition column 2614. The computing device 200 extracts a defect candidate that matches the numerical value among the respective defect candidates and displays the value in the defect candidate list 2613. Instead of or in addition to the input of the classification of each defect candidate by the user, the determination result by the DR-SEM 270 may be reflected as a classification.

FIG. 7 is an example of a setting screen 262 used by the user to adjust defect extraction parameters. The setting screen 262 is displayed on the display unit 260. The processing device 200 totalizes the number of true information and the number of false information input by the user on the defect candidate screen 261 for each region label and stores the totalized number in the image storage unit 230. When the user inputs the region label to a region label column 2621, a graph 2622 displays the number of true information, the number of false information, and the number of unclassified information totalized for the region label. For the number of true information and the number of false information, in addition to the number of true information 2622-1 and the number of false information 2622-2 calculated based on the true information and the false information classified as defects by using the screen of FIG. 6 with respect to the defect candidates detected by the region label, the number of true information 2622-3 and the number of false information 2622-4 added for parameter adjustment are also displayed at the same time.

In a specific region label, for example, when the parameters are adjusted with a small number of true information obtained when the true information is not sufficiently obtained, the parameters overfitted to the given defect candidate will be obtained, and thus, it is preferable to display the numbers, such as 2622-3 and 2622-4 including the number detected by the additional defect candidate data such that the parameters can be adjusted. Meanwhile, since the additional data is not data of a predetermined region which is a target of the parameter adjustment, when using the additional defect candidate data, the data deviates from the defect detection number obtained by the actual inspection. Accordingly, it is required to simultaneously display the number of defect candidates obtained by the region label targeted by the parameter, that is, 2622-1 and 2622-2, to the user. Regarding the addition of the defect candidate data, the defect data detected by different region labels or library data registered in advance is used. Details of an adding method of the defect candidate feature amount will be described later.

A parameter table 2623 is a list of threshold values used when the normalization unit 221 and the determination unit 224 extract the defects for the corresponding region label. For example, when a feature amount Param 1 of a certain defect candidate exceeds a threshold value 3, the determination unit 224 extracts the defect candidate. A parameter table 2624 is a list of coefficients and threshold values used by the space classifier 222. For example, Ch1 is a coefficient and a threshold value used by the linear sum calculator 222_1. The parameters are stored in the extraction condition storage unit 250 as defect extraction parameters.

The user selects any one of the parameters in the parameter table 2623 or the parameter table 2624 with a pointer 2625. When it is assumed that the selected parameter is changed within a certain range (the range may also be designated by the user), the processing device 200 recalculates how to change the number of true information, the number of false information, and the number of unclassified information, according to the procedure described in FIGS. 3 to 5. The graph 2622 displays a relationship between the parameter change and each detected number change. The user designates a parameter value for obtaining the desired detection number by moving a slider 2626, and presses an application button 2627. Typically, the user designates a parameter value having a large number of true information and a small number of false information, but there are also cases where the number of unclassified information is also added. The parameter value that corresponds to the slider 2626 at the time of pressing the application button 2627 is reflected on the parameter that corresponds to the pointer 2625, and the extraction condition storage unit 250 stores the parameter value.

In a case of adjusting the defect extraction parameters in accordance with the procedure as described above, it is difficult to obtain an optimum defect extraction condition by adjusting a single parameter only, and thus, trial and error occur while changing a plurality of parameters in parallel. Therefore, there is a tendency that it takes a lot of time to adjust the parameters, which causes a burden to the user.

FIG. 8 is an example of the setting screen 262 used by the user to adjust defect detection parameters in the present Example 1.

Instead of separately extracting the defect extraction parameters described in FIG. 7, the user inputs a range of sensitivity index values which will be described later to an index value column 2628. When the user presses a calculation button 2629, the processing device 200 (extraction condition calculation unit 240) recalculates the number of true information, the number of false information, and the number of unclassified information according to the procedure described in FIGS. 3 to 5 while maximizing the evaluation value which will be described later. The processing device 200 temporarily stores the defect extraction parameters calculated corresponding to each sensitivity index value in the extraction condition storage unit 250. The graph 2622 displays each sensitivity index value and the number of true information, the number of false information, and the number of unclassified information, which correspond to the sensitivity index values. Those displayed as detection in the drawing is the numbers of candidates detected in the specified region label, and those displayed as detection+addition is the detected number of defects to which the defect candidate is added for the parameter adjustment other than the number detected by the region label.

When the user moves the slider 2626, the processing device 200 reads the defect extraction parameters that correspond to the sensitivity index value pointed by the slider 2626 and displays the defect extraction parameters in the parameter tables 2623 and 2624. The user designates the sensitivity index value for obtaining the desired detection number by moving the slider 2626, and presses the application button 2627.

The image acquired at the time of inspecting the defect detected by the region label which adjusts the parameters is displayed in 2650 and the image of the defect added for other parameter adjustment is displayed in 2651. In both cases, when pressing 2627, the image is displayed to ascertain what is detected by the parameter adjusted by the sensitivity index value. Specifically, it is illustrated that an image of a defect which is not detected is not displayed, or undetected by changing the background of the image as illustrated in 2652.

FIG. 9 illustrates a function of designating the adding method of data to be added for adjustment of the parameters on the screen of FIG. 8. 2670 illustrates the region label, and it is possible to determine whether to add the data of the region by a toggle when being pointed. Here, it is illustrated that the defects of a region 6 illustrated in 2672 and a region 7 illustrated in a region 2673 in addition to a region 4 illustrated in 2671 to which the parameters are applied are used for the adjustment of the parameters. 2674 illustrates that the defect candidates obtained when the synthesis is performed with the in-same-die similar image by a method of synthesizing the reference images (synthesis with 303-2) and the defect candidates obtained by synthesizing with an inspection target image neighboring image (214-2) are added among the detected defects. Furthermore, 2675 illustrates that the feature amount of the defect which depends on detectors is replaced, and the defect is handled as another defect and added.

For example, when the number of true information manifested by the detector of D3 is insufficient, the defect feature obtained by replacing the image feature amount of D3 with the image feature amount calculated from the appearance image captured by the detector of D2 having a similar feature is synthesized and added as a feature amount of new true information. Details will be described with reference to FIG. 18. 1501 indicates the incident light, and 1510 indicates a range where the reflected or scattered light from the light that hits the sample surface can be detected by an ideal lens having one opening. The device includes three detectors. Ranges where the reflected or scattered light from the sample surface is detected by the three detectors D1, D2, and D3 are 1502, 1503, and 1504. It is possible to consider that the reflected light of the defect or the false information can be taken with a probability which is statistically the same to a certain extent in D2 and D3 which are detection systems symmetrically disposed with respect to the incidence of the light even when there is directivity in the distribution in which each of the true information or the false information reflects the light. For example, when the appearance feature amount extracts three feature amounts respectively from the images captured by the three detectors D1, D2, and D3 similar to X in the following, the following formula is possible.

$$X=[x(D1,1)x(D1,2)x(D1,3)x(D2,1)x(D2,2)x(D2,3)x(D3,1)x(D3,2)x(D3,3)]^T \quad \text{[Formula 1]}$$

When replacing the feature obtained from the image captured by D2 having the feature amount and the feature obtained from the image captured by D3 in the feature amount of Formula 1, the feature is converted into the following feature.

$$X=[x(D1,1)x(D1,2)x(D1,3)x(D3,1)x(D3,2)x(93,3)x(D2,1)x(D2,2)x(D2,3)]' \quad \text{[Formula 2]}$$

In this manner, even for a detector with a small number of manifested defects, the number of defects that can be used for the parameter adjustment is increased, thereby performing the adjustment easily. The determination on whether or not the defect is manifested is made by a normalization difference brightness value of the defect portion calculated for each image, but is not limited thereto. The appearance feature amount, such as a difference brightness value that is not normalized, inspection target image brightness, or a differential value thereof may be used.

2676 is a switch for determining whether to automatically incorporate the defect feature data incorporated in the device in advance in addition to the defect detected by another region label of the same sample, and switching is performed by the toggle by pressing 2676. The defect feature data incorporated in the device may be obtained by making the defect feature known from the device characters into a feature amount, or may be defect data obtained by the inspection with respect to another sample. When pressing 2680, the property of data to be automatically added is determined, and the property is displayed as a candidate to the user. Details of the determination method will be described later.

The processing device 200 searches for defect extraction parameters that can maximize an evaluation value Popt(S), for example, according to the following Formula 3. For example, the search can be performed by repeatedly changing elements of P until the maximum value of the evaluation value Popt(S) converges. P is a vector (a vector having coefficients, threshold values, and the like as elements) of the defect extraction parameters. CountD is the number of true information obtained by using the initial value of the defect extraction parameters. CountF is the number of false information obtained by using the initial value of the defect extraction parameters. Cd(P) is the number of true information extracted using the defect extraction parameter vector P. Cf(P) is the number of false information extracted using the defect extraction parameter vector P. S is a sensitivity index value input to the indicator value column 2628. 0 is a small value (negative offset).

$$P_{opt}(S) = \arg\max_{P} \min \left( Cd(P), S(Count_D + Count_F) \left( \frac{Cd(P)}{Cd(P) + Cf(P)} - o \right) \right) \quad [\text{Formula 3}]$$

By maximizing the evaluation value Popt(s) according to Formula 3, the computing process proceeds in a direction of maximizing Cd(P) as a whole. However, when a true information ratio (number of true information/(number of true information+number of false information)) is small, the term on the right side of an operator min is selected, and as a result, a possibility to determine that the computing process has not yet obtained the maximum value increases. Through the operation of the operators, it is possible to perform the computing process that maximizes Cd(P) while maintaining the true information ratio to a value which is large to a certain extent. A negative offset 0 is for forcibly selecting the term on the right side when the left and right terms within the operator min are the same as each other by chance.

As the user, it is possible to obtain the optimal defect extraction parameter vector P that considers both the Cd(P) and the true information ratio simply by designating a degree of emphasizing the terms on the right side of the operator min as the sensitivity index value S in Formula 3.

The computing device 200 can also set the weight for each classification (Class) of the defect candidates. For example, positive values are used as weights of true information classification, negative values are used as weights of false information classification. Accordingly, the evaluation value can increase as the number of true information increases and the evaluation value can decrease as the number of false information increases.

In this case, the following Formula 4 is used instead of Formula 3. Wdi is the weight of true information classification i. Wfi is the weight of false information classification i. Cdi(P) is the number of true information belonging to the i. true information classification i extracted using the defect extraction parameter vector P. Cfi(P) is the number of false information belonging to the false information classification i extracted using the defect extraction parameter vector P.

$$P_{opt}(s) = \arg\max_{P} \min \left( \sum_i W d_i C d_i(P), \right.$$

$$\left. S(Count_D + Count_F) \left( \frac{\sum_i W d_i C d_i(P)}{\sum_i W d_i C d_i(P) + \sum_i W f_i C f_i(P)} - o \right) \right) \quad [\text{Formula 4}]$$

In this manner, it is possible to calculate the defect extraction parameter vector P to maximize the evaluation value Popt(s). At this time, when the number of defect candidates is small, the parameters overfitted to the defect detected in the inspection at this time are calculated in the Formulas 3 and 4. In an extreme case, when the true information is not detected, Cd(P) in Formula 3 or Cdi (P) in Formula 4 is always 0 regardless of the parameters, and thus, it is not possible to calculate the parameters by either formula. Accordingly, it is necessary to additionally provide the true information which cannot be detected in order to calculate the parameters.

FIG. 10 is a PAD diagram illustrating a procedure in which the processing device 200 adjusts defect extraction parameters. In the PAD diagram, first, a method of adjusting the parameters together with the defect feature amount that is virtually set, without adding the true defect when the number of true information is insufficient is described.

(FIG. 10: Steps S900 to S902)

The defect inspection device 100 captures the appearance image of the sample 110 (S901). The processing device 200 extracts the defect candidates according to the procedure described in FIGS. 3 to 5 (S902). This process is performed until an image of the entire surface of the sample 110 is captured and the defect candidates are extracted (S900). In the steps, it is desirable to perform a high sensitivity inspection with a relatively large number of false information such that important defects are detected.

(FIG. 10: Step S903)

The user selects defect candidates on the defect candidate screen 261 and inputs the classification for each defect candidate. In principle, each defect candidate is classified into the true information and the false information, but more detailed defect classification may be given. Instead of or in combination with the input by the user, the determination result by the DR-SEM 270 may be used. The processing device 200 can appropriately include an interface 280 for transmitting and receiving determination results (for example, a communication network) with a user input (for example, a keyboard or a mouse) or the DR-SEM 270.

(FIG. 10: Steps S904 to S905)

The processing device 200 counts the number of true information among the classification results given to the defect candidates input by the user, and sets a virtual defect feature when a predetermined number cannot be obtained. In general, the false information of which the detected number is insufficient becomes the true information since the false information is found by decreasing the threshold value such that the high sensitivity inspection is performed in the defect extraction in S902. Here, what substantially should be set as the virtual defect corresponds to the true information.

Details of the setting will be described with reference to FIG. 21. As described above, since the defect having a large normalization difference pixel value is extracted as a defect, the defect having a large normalization difference pixel value is set as a virtual defect. In addition, there are many cases where the information found by a plurality of detectors is the true information. As illustrated in 1801, in the distribution of the normalization difference pixel values obtained by the plurality of detectors D1 and D2, the values are manifested by two or more detectors at the same time, and the feature amount of the virtual defect is set to a designated number such that the sum of the values is equal to or greater than a certain value.

(FIG. 10: Steps S908 to S907)

The user inputs a plurality of sensitivity index values (or ranges of sensitivity index values) on the setting screen 262 (S906). The processing device 200 performs steps S908 to S912, and the setting of the virtual defect is performed for each of the input sensitivity index values (with an equivalent interval when the range is designated) in steps S914 to S915 (S913).

(FIG. 10: Steps S907 to S912)

The processing device 200 selects the sensitivity index value S that corresponds to the highest sensitivity among the sensitivity index values S, and optimizes the defect detection parameters according to Formula 3 (Formula 4 in a case of weighing the classification). The processing device 200 calculates the number of true information, the number of false information, and the number of unclassified information by using the defect extraction parameter optimized in step S908 and the feature amount of each defect candidate (S909).

The number of true information and the number of false information are calculated in S909, it is determined in S910 whether the defect detection number is smaller than the expected detection number, which is calculated from the inspection area and the predetermined detection density to be expected, and when the defect detection number is smaller than expected detection number upon detection, the virtual defect is re-set in S911 similar to S905. In addition, here, the normalization difference pixel value is set to be smaller than that in the setting in S905. When the setting is completed, a loop starting from S908 is performed again. When the number of false information is equal to or greater than the expected number in the determination of S910, it is considered that the condition of S907 is satisfied, and the process proceeds to the next step S913.

(FIG. 10: Steps S914 to S915)

The processing device 200 optimizes the defect detection parameters according to Formula 3 (Formula 4 in a case of weighing the classification) considering the sensitivity index value S as an input parameter, and stores the optimized defect detection parameters in the extraction condition storage unit 250 (S914). The processing device 200 calculates the number of true information, the number of false information, and the number of unclassified information by using the defect extraction parameters optimized in step S914 and the feature amount of each defect candidate (S915). This is executed for the range set by the sensitivity index value (S913).

(FIG. 10: Steps S916 to S918)

The setting screen 262 displays the number of true information, the number of false information, and the number of unclassified information in the graph 2622 (S916). The user selects the sensitivity index value using the slider 2626, and the processing device 200 displays the defect extraction parameters calculated using the sensitivity index value, in the parameter tables 2623 and 2624 (S917). When the user presses the application button 2627, the extraction condition storage unit 250 stores the defect extraction parameters, and the processing device 200 subsequently inspects the defects of the sample 110 using the defect extraction parameters (S918).

FIG. 11 is a PAD diagram illustrating another example of the procedure in which the processing device 200 adjusts defect extraction parameters. First, the defect candidates are extracted in steps S901 to S903 in FIG. 10 (not illustrated in FIG. 11). Next, the parameters are adjusted for each region label indicating the partial region of the inspection target.

In the PAD diagram illustrated in FIG. 11, a method of adjusting the parameters by adding the defect data detected in another region of the individual partial region is described. The processing device 200 calculates the number of true information and the number of false information of the defects classified in the partial region for adjusting the parameters and determines whether the number of defects is insufficient (S904). In the determination on whether or not the defect is insufficient, regarding the defects that are detected in the partial region to adjust the parameters and classified as the true information, the number of defects is obtained by determining whether or not the defects are manifested as images for each detector, and it is determined whether or not the number of defects is insufficient under each condition as a default value.

When the number of defects is insufficient, steps S920 to S923 are performed. In S920, the processing device 200 evaluates whether or not the defects exist in a similar region. With a partial region designated by the display of 2670 similar to the region to be adjusted as a similar region, among the true information detected in the similar region, the true information manifested by the detector in which the number of manifested information is insufficient is added (S921).

When there is no true information manifested by the insufficient detector and the designation of 2675 is performed to use the feature amount of each detector as a feature of the detector, the feature amount obtained by another detector is converted and added as a feature amount of another detector. Next, in step S922, it is checked whether or not the number of true defects manifested by each detector has reached the prescribed number, and when the number of manifested true defects is insufficient, a virtual defect is set in step S923 in the same manner as described in step S911 of FIG. 10.

Next, step S906 described in FIG. 10 is executed, and then, the loop of S907 is executed. First, steps S908, S909, and S910 are performed in the same manner as in FIG. 10. In S910, when the calculated number of false information is small, steps S930, S931, S932, and S933 are executed in the same manner as S920, S921, S922, and S923, and the number of additional defects is increased. Similar to a case where a virtual defect having a lower normalization pixel value than that in S905 is set in S911, a virtual defect having a lower normalization pixel value than that in S923 is set in S933. When it is determined that the expected defect detection number is large, the loop is completed in S912.

Since the subsequent steps S913, S914, S915, S916, and S917 are the same processes as those described in FIG. 10, the description thereof will be omitted.

Here, a method for searching for a similar partial region will be described with reference to FIGS. 19(a) and 19 (b). 1601 illustrated in FIGS. 19(a) and 1602 illustrated in FIG. 19(b) are histograms and brightness and frequency, and indicate the brightness and frequency of the reference image in the coordinates of the detected defect candidates. The computing device 200 calculates the histogram in each partial region, and then evaluates the similarity by using the normalization correlation. In other words, when the histogram of the partial region to be subjected to the parameter adjustment is h1 and the histogram of the partial region to be compared is h2, the evaluation value is obtained by the following Formula 5.

$$r = \frac{\sum_i h1(i)h2(i)}{\|h1\|\|h2\|}$$ [Formula 5]

When the normalization correlation value of Formula 5 exceeds a certain value, the two partial regions are determined to be similar regions by outputting the defect candidates from substantially the same region. In addition, although the normalization correlation is used here, the similarity may be evaluated using other methods, such as a x-squared test. Further, instead of the brightness, other features of reference images, such as brightness value after applying an edge filter or standard deviation of the brightness in a neighboring region may be used, or a feature amount represented by vectors combined by several features may be used.

Another example of searching for a similar partial region will be described with reference to FIG. 20. In a case of inspecting the semiconductor wafer, and when there are many partial regions, the calculation is automatically performed using design data. Here, when there are many partial regions, the partial regions are roughly divided into a memory portion, a memory peripheral portion and a logic portion, and are further segmented by the circuit patterns. In addition to this, the chip of the semiconductor wafer is handled as a different partial region depending on the partial die in which the circuit is only partially formed at the center, periphery, or outermost circumference of the wafer. Between each classification, the distance between the circuits is set in advance from the properties of the circuits. For example, in a case of the memory classified as a memory but is designed differently, the distance is 0.5, but the distance is set based on the appearance of the known circuit such that the distance at the direct periphery of the memory and in the corner portion of the memory is 3.

In addition, regarding the position of the chip, a similarity between the inner and outer peripheral chips of the wafer is 1, but the distance to the partial die of which the similarity largely changes is set to 3. Furthermore, when the defects are detected using a plurality of defect extraction algorithms in combination, the distance between the algorithms is defined. The distances respectively determined by a die comparison using 303-1 as a source image for calculating the reference image and a neighboring image comparison using the in-die similar image that uses 303-2 and the reference image by 214-2 from the vicinity of the inspection target image are set, and the defect candidates of the same algorithm is added in the parameter adjustment of the defect candidate extracted with the same algorithm as much as possible. Furthermore, the similarity between detectors is also defined. For example, it is determined that the distance between 1503 and 1504 is set to 0.1 and the distance between 1502 and 1503 is set to 1, and a closer distance to the target partial region is selected as a defect to be added. For example, although there is a distance in a circuit pattern, the conversion of the detector may not be performed, and thus, it is determined to add the defect feature of the circuit pattern that is not comparatively similar.

The distance between the partial regions is expressed by the sum of the distance of the circuit pattern in the chip, the distance between the chips, and the distance between the algorithms. When the distance is within a certain distance, the region is determined as a similar region. For example, when the distance determined by the circuit pattern and the detection system is D, the correlation value calculated by Formula 5 is r, and the gain parameters registered in the system are G1 and G2, the similarity is determined by Equation of G1 (1−r)+G2D, and when the value is smaller than the determined value, the similarity is reflected to 2670, 2674, and 2675 to be similar.

Preferably, the similarity between the regions may be evaluated by combining the determination of the similar region described in FIG. 19 and the determination method described in FIG. 20. The ID of the region which is considered to be similar in this manner is displayed by 2670 in FIG. 9. In addition, when the distances between the different algorithms are close, an algorithm different from the region to be adjusted is selected by 2674.

Library data for determining the application in 2676 is stored in the image storage unit 230, and in each defect data, the histogram information of the partial region acquired by the defect or the circuit information is stored together. Furthermore, a pixel size, a wafer notch direction, and a polarization direction of the illumination, which are imaging conditions, are stored, and in the library data that matches the imaging conditions of the target partial region, automatically extracted is the fact that the partial region, in which the defect data in which the similarity of the partial regions or the distances are calculated and registered in the library is detected, is determined to be similar to the partial region to adjust the parameters, and the data is added.

Example 2

In Example 1, the configuration example in which the defect extraction parameters corresponding to each sensitivity index value are optimized by designating the range of the sensitivity index value, and the user selects the parameters that satisfy the desired requirement has been described.

In Example 2 of the present invention, a configuration example in which similar processing is performed using parameters other than the sensitivity index value will be described. Since the other configurations are similar to that of Example 1, the parameters used instead of the sensitivity index value will be mainly described below.

FIG. 12 is an example of a setting screen 263 used by the user to adjust defect detection parameters in Example 2. The user can use the setting screen 263 instead of or in combination with the setting screen 262. A region label 2631, a parameter table 2633, and a parameter table 2634 are the same as those described in FIG. 8.

The user selects which one of the defect capture ratio, the false information ratio, and the false information remaining ratio is to be used as a standard to optimize the defect extraction parameters. The defect capture ratio is obtained by (the number of true information extracted using the current defect extraction parameters)/(the number of true information extracted using the initial value of the defect extraction parameters). The false information ratio is obtained by (the number of false information)/(the number of true information+the number of false information). The false information remaining ratio is obtained by (the number of false information extracted using the current defect extraction parameters)/(the number of false information extracted using the initial value of the defect extraction parameters). In addition, the current defect extraction parameters here refer to the defect extraction parameters used in S902. The user selects which of the above is to be used and further inputs a desired range to the index value column 2638. In the example of FIG. 12, it is instructed to obtain all combinations of the defect extraction parameters having the defect capture ratio in the range of 60 to 90.

When the user presses a calculation button 2639, the processing device 200 obtains all the combinations of the defect extraction parameters according to the designation. The defect extraction parameters that satisfy the designated condition can also be obtained, for example, by comprehensive searching, or by a known searching method.

The defect capture ratio can also be designated as, for example, 80% or more. The false information ratio can also be designated as, for example, 40% or less. The false information remaining ratio can also be designated as, for example, 10% or less.

A parameter table 2632 displays the defect extraction parameters obtained according to the designation of the user, and the defect capture ratio, the false information ratio, the false information remaining ratio, the number of true information, the number of added true information, the number of false information, and the number of added false information in a case of using the above defect extraction parameters. Furthermore, the detected number of each defect class is output. When the user selects one of the rows, the parameter tables 2633 and 2634 display details of the defect extraction parameters that correspond to the row. By simultaneously displaying, in the row, the number of true information and the number of false information of the partial region that is the target and the number of true information and the number of false information which are further added, the user can grasp the estimated detection number in the inspection target which is the target and the detected state of the data used for the teaching at the same time.

Since the image display units 2650 and 2651 are the same as those in FIG. 9, the description thereof will be omitted.

FIG. 13 is a PAD diagram illustrating the procedure in which the processing device 200 adjusts defect extraction parameters in Example 2. Steps S900 to S905, S907 to S912, and S914 to S918 are the same as those in FIG. 10 (FIG. 13: step S1101).

The user selects which parameters are used as a standard for optimizing the defect extraction parameters on the setting screen 263, and also inputs a value range (or a plurality of values) (S1101). The processing device 200 performs steps S914 to S915 for each of the input standard parameters (with an equivalent interval when the range is designated) (S1102).

Example 3

FIG. 14 is a block diagram illustrating an internal configuration of the space classifier 222 in Example 3 of the present invention. In Example 3, the space classifier 222 newly includes internal computing blocks 222_9 to 222_13 in addition to the configuration described in Example 1. Hereinafter, the differences caused by adding the internal computing blocks will be described.

First, the internal computing block 222_9 will be further described with reference to FIG. 15.

The internal computing block 222_9 receives the normalization difference pixel values 307a to 307c and individually determines whether or not each normalization difference value exceeds the threshold value in binarization determination units 222-9a, 222-9b, and 222-9c provided in the 222_9. Each threshold value can be set to a different value for each detection system. The threshold values are stored in the extraction condition storage unit 250 as a defect extraction parameter. The binarization determination result is sent to a logical sum unit 222-9d, and when any one of the normalization difference pixel values 307a to 307c is equal to or greater than the threshold value, the output indicating that the pixel is a defect is delivered to the internal computing block 222_13.

Internal computing blocks 222_10 and 222_11 perform the same processing as an internal computing block 222_12. First, the internal computing block 222_12 will be described.

222-12a, 222-12b, and 222-12c are binarization determination units provided in 222-12, and have the same functions as those of 222-9a, 222-9b, and 222-9c. The outputs of 222-12a, 222-12b, and 222-12c are sent to a logical product unit 222-12d, and when all the normalization difference pixel values 307a to 307c are equal to or greater than the threshold values, it is determined that the values are defect candidates and the determination is delivered to the internal computing block 222_13. The threshold values used in 222-12a, 222-12b, and 222-12c can be stored in advance in the extraction condition storage unit 250 and can be further adjusted as a defect extraction parameter.

The internal computing blocks 222_10 and 222_11 have the same function as that of the internal computing block 222_12, but the threshold values to be given to the binarization determination unit provided therein are set to values different from those used for 222-12a, 222-12b, and 222-12c. The threshold values can be stored in advance in the extraction condition storage unit 250 and can be further adjusted as a defect extraction parameter.

In general, the threshold values applied in the binarization determination units 222-9a, 222-9b, and 222-9c provided in 222_9 are set to large values with respect to the threshold values used in 222_10, 222_11, and 222_12.

The internal computing block 222_13 regards the pixel in which any one of the internal computing blocks 222_10 to 222_12 is determined as a defect, as a defect candidate. 222_10 to 222_12 are led to the logical sum unit 222_13a provided in 222_13 and take the logical sum. Furthermore, the output is led to a logical product unit 222_13b.

The internal computing block 222_13 receives the output from the logical sum unit 222_8. 223_13b outputs the pixel in which the logical sum unit 222_8 has determined to be a defect candidate and the pixel in which 222_13a regarded as a defect as defect candidates. Accordingly, since only the defects manifested by both the internal computing blocks 222_1 to 222_8 and the internal computing blocks 222_9 to 222_12 can be extracted, the false information can be reduced. The result is output to 222_13c.

Different threshold values are used for further verification in a multi-faceted manner. The internal computing block 222_12 is based on the assumption that if the value greatly exceeds the threshold value in any detection system, the pixel is a defect. The output of 222_12 is led to the logical sum unit 222_13c provided in 222_13, the logical sum with the output of 222_13b, is calculated and a final defect determination output 222_out is output. By using the above together, the defect candidates can be extracted more accurately.

FIG. 16 is a conceptual diagram illustrating an aspect in which the space classifier 222 in the present Example 3 separates defects and noise. For the convenience of the description, illustrated is an example in which a two-dimensional feature amount space where two feature amounts are respectively space shafts. O indicates the true information, x indicates the false information, and A indicates the undetected false information.

A discrimination surface 1301 is a boundary surface which is a reference for extracting the defects using the initial values of the defect extraction parameters by the internal computing blocks 222_1 to 222_8. The defect candidates disposed above the boundary surface are determined as defects by the space classifier 222. Therefore, O and x are determined as defects.

A discrimination surface 1302 is a boundary surface after adjusting the defect extraction parameters. In this case, some x and O are determined as defects. When the discrimination surface becomes 1303 by further adjusting the defect extraction parameters, it is possible to detect all defects detected on the discrimination surface 1301 and exclude all the false information. Meanwhile, however, defect candidates that have been undetected on the discrimination surface 1301 are also detected as defects, and thus, there is a concern of erroneous detection.

In order to avoid this, for example, virtual false information is created in the intercepts 1304 and 1305 of the discrimination surface 1301, a large weight is given to the classification to which the virtual false information belongs, and the defect candidates belonging to the classification may be made difficult to be detected as the true information. Accordingly, it is possible to avoid the setting of the boundary surface similar to the discrimination surface 1303.

As another means, it can be considered that a new discrimination surface 1306 or 1307 is set by the internal computing blocks 222_9 to 222_12. Accordingly, only the defect candidates in the upper right regions of the discrimination surfaces 1303, 1306 and 1307 are detected as defects, and thus, only the true information can be accurately extracted.

Example 4

FIG. 17 is an example of a setting screen 264 used by a user to adjust defect detection parameters in Example 4 of the present invention. The upper half of the screen is the same as the setting screen 262. However, the user inputs that the entire region is collectively selected for the region label column 2621. The processing device 200 collectively calculates the number of true information, the number of false information and the like for the entire region label according to the same procedure as in Example 1, and a totalization column 2641 displays the result.

Specifically, the totalization results, such as the number of true information, the number of false information, the number of unclassified information, the true information ratio, the false information ratio, the defect capture ratio, the defect remaining ratio, and the like, which are detected for all the region labels, are displayed. As for the number of true information and the defect capture ratio, it is possible to display both the display of only the defect detected in the partial region and the display when the added defect is added. Otherwise, any one of the above may be selectively displayed.

In the present Example 4, comprehensive optimization is performed for the entire region in Formula 1 or 2. Accordingly, automatic adjustment is performed in which the detection sensitivity increases in the region where the defects are likely to occur and the detection sensitivity decreases in the region having a large number of false information. Since the sensitivity index value can be collectively adjusted for the entire region, it is possible to further reduce the burden of adjusting the defect extraction parameters.

Example 5

In Example 5 of the present invention, a specific computing equation used by the processing device 200 to detect defects will be described. The configurations of the defect inspection device 100 and the processing device 200 are the same as those of Examples 1 to 4.

The condition under which the computing device 200 extracts defect candidates is represented by the following Formula 6. Gi is a coefficient used internally by the space classifier 222, and the arrangement of coefficients used by each of the internal computing blocks (seven in FIG. 5) is used. X is the arrangement of the feature amounts and has the same number of elements as the dimension number of feature amount space. Thi is the detection threshold value.

$$G_1X > Th_1 \lor G_2X > Th_2 \lor \ldots G_nX > Th_n$$

$$G_i = [gi_1 gi_2 \ldots gi_m]^T$$

$$X = [x_1 x_2 \ldots x_m]^T \quad \text{[Formula 6]}$$

The above-described Formula 6 can be substituted by the Formula 7 below. j is an index of the defect candidate. t(j) is 1 in a case of the true information, and is −1 in a case of the false information. class(j) is the classification to which the defect candidate j belongs. C( ) is the cost and is given to the true information class when no defect is detected, or to the false information class when the false information is detected. ξi is a slack variable.

$$t(j)K(G_i^T X(j) - Th_i) \geq 1 - \xi_i \quad \text{[Formula 7]}$$

In Formula 7, when substituting KGi=wi and KThi=bi, the processing device 200 can detect the defects by solving the optimization problem expressed by the following Formula 8. J(j) sets a value which is equal to or less than 1 if the defect is already detected when i is not a current value, and in other cases, 1 is set.

$$w = \arg\min_{w_i,} \frac{1}{2}\|w_i\|^2 + C(\text{class}(i))J(j)\sum \xi_i \quad \text{[Formula 8]}$$

subject to $$t(j)(w_i X(j) - b_i) \geq 1 - \xi_i$$

As described above, a defect inspection method according to Example of one aspect of the present invention is characterized to include: a step of receiving the defect class that can identify true information or false information regarding the defects of the inspection target; a determining step of determining whether or not the number of true information and the number of false information are insufficient to set defect extraction parameters of a predetermined region; a step of extracting a feature amount of a defect in a region other than the predetermined region when it is determined that the number of true information and the number of false information are insufficient in the determining step; a totalizing step of totalizing the feature amounts by adding the feature amount of the defect extracted in a region other than the predetermined region to the feature amount of the defect extracted in the predetermined region; and a display step of displaying the totalized feature amount of the defect for the adjustment of the defect extraction parameters.

In addition, a defect inspection method according to Example of another aspect of the present invention is characterized to include: a step of performing inspection with relatively high sensitivity with respect to normal inspection; a step of attaching labels of true information or false information to the defects based on images acquired when inspecting the detected defect candidates or images acquired by another review device until each number of true information and false information reaches a predetermined number; a step of automatically calculating a plurality of candidates of an inspection condition including a plurality of parameters such that true information and false information can be discriminated in the label-attached defect candidates for each designated region; a step of displaying the expected number of true information and the expected number of false information in the candidates of each of the inspection parameters; and a step of automatically calculating and displaying the candidates of the inspection condition by adding the appearance feature of the true information in a region other than the designated region or the known true information when the predetermined number of true information is not obtained by the inspecting step or when the true information is not manifested in the image acquired by a specific detector, in which the inspection condition can be set by selecting the automatically calculated inspection condition even when the insufficiency of the true information occurs at the time of setting the inspection condition.

In this manner, in Examples of the present invention, the defect class that can identify the true information or the false information regarding each defect input by the user is received; it is determined whether or not the number of true information and the number of false information are insufficient to set the defect extraction parameters of the predetermined region; the feature amounts are totalized by adding the feature amount of the defect extracted in a region other than the predetermined region to the feature amount of the defect extracted in the predetermined region when it is determined that the number of true information and the number of false information are insufficient; and the totalized feature amount is displayed to the user for the adjustment of the defect extraction parameters. Accordingly, in Examples of the present invention, it is possible to set the parameters used for detecting the defects with a less burden to the user.

More specifically, in Examples of the present invention, the inspection with a relatively high sensitivity with respect to normal inspection is performed; labels of true information or false information are attached to the defects with respect to the detected defect candidates based on images acquired when inspecting the detected defect candidates or images acquired by another review device until each number of true information and false information reaches a predetermined number; the plurality of candidates of the inspection condition including the plurality of parameters such that the true information and the false information can be discriminated are automatically calculated in the label-attached defect candidates for each designated region; the expected number of true information and the expected number of false information in the candidates of each of the inspection parameters are displayed to the device user; and the device user can select an appropriate inspection condition. At this time, when a predetermined number of true information cannot be obtained by the high-sensitivity inspection or when the true information is not manifested in the image acquired by the specific detector, it becomes possible to automatically calculate the candidate of the inspection condition by adding the true information in a region other than the designated region or the appearance feature of the known true information. Accordingly, the user can select an inspection condition based on the number of false information detected by each inspection condition and the appearance thereof.

In this manner, according to Examples of the present invention, due to both the segmented inspection region and the multiple detector integrated inspection, even when the insufficiency of the true information occurs at the time of setting the inspection condition, it becomes possible to set the inspection condition simply by selecting the automatically calculated inspection condition. Therefore, the burden of setting the inspection condition parameters for the user can be reduced.

REFERENCE SIGNS LIST

100: defect inspection device
110: sample
200: processing device
210: image processing unit
220: defect determination unit
230: image storage unit
240: extraction condition calculation unit
250: extraction condition storage unit
260: display unit
270: DR-SEM

The invention claimed is:

1. A defect inspection device comprising:
a memory;
a display; and
a processor communicative coupled to the memory and the display, the processor configured to:
generate an appearance image of an inspection target,
calculate a feature amount of the appearance image generated;
store, via the memory, the feature amount and the appearance image,
store, via the memory, extraction condition data defining an initial value of an extraction condition for extracting a defect of the inspection target,
extract defects of the inspection target by comparing the feature amount with the extraction condition,
output information indicating the defect extracted,
designate whether the defect extracted by the defect determination unit is a true defect or a false defect,
totalize the feature amounts of appearance images of defects of a predetermined region of the inspection target in association with each of the true defects and the false defects designated,
calculate an expected value of the number of defects to be detected under a specific extraction condition, based on the feature amount totalized,
display, via the display, an expected value of the number of defects to be detected for each of the true defects and the false defects under each of a plurality of extraction conditions,
use the feature amount totalized and determines whether or not the total number of the feature amounts of the number of true defects or the number of false defects is less than a predetermined threshold, and adds the feature amount of the appearance image of the true defects or the false defects extracted out of the predetermined region when it is determined that the number of true defects or the number of false defects is less than the predetermined threshold, and independently calculates an expected detection number of defects which are inspection targets and an expected detection number of defects which are not inspection targets.

2. The defect inspection device according to claim 1, wherein the processor is further configured to:
  extract defects using different extraction conditions for each of the divided partial regions of the inspection target,
  totalize the feature amounts of the defects extracted in a partial region designated in the inspection target as the feature amounts of the defects of the inspection target, and totalizes the feature amounts of the defects extracted in a region other than the designated partial region in the inspection target as the feature amounts of the defects extracted in a region other than the partial region, and
  display, via the display, extraction condition data in the designated partial region, an expected detection number of true defects and an expected detection number of false defects which are expected to be detected in the designated partial region, and an expected detection number of true defects or false defects which is not extracted in the designated partial region.

3. The defect inspection device according to claim 1, wherein the processor is further configured to:
  extract defects using different extraction conditions for each of the divided partial regions of the inspection target,
  totalize the feature amounts of the defects extracted in a partial region designated in the inspection target as the feature amounts of the defects of the inspection target, and totalizes the feature amounts of the defects other than the defects extracted in the designated region of the inspection target as the feature amounts of the defects which are not extracted in the designated partial region, and
  display, via the display, extraction condition data in the designated partial region, an expected detection number of true defects and an expected detection number of false defects which are expected to be detected in the designated partial region, and an expected detection number of true defects or false defects which is not extracted in the designated partial region.

4. The defect inspection device according to claim 1, wherein the processor is further configured to:
  store the feature amounts of a reference image that corresponds to the region where the defects are extracted, and
  evaluate similarity between the regions by comparing distribution of the feature amounts of the reference image in a region which is a target for totalizing the feature amounts with distribution of the feature amounts of the reference image which is acquired in another region and stored in the memory, and adds and totalizes features of different defects stored in the memory when it is determined that the distributions are similar.

5. A defect inspection method comprising:
  an image generating step of generating, via a processor, an appearance image of an inspection target;
  a feature amount calculating step of calculating, via the processor, a feature amount of the appearance image;
  a reading step of reading, via the processor, extraction condition data defining an initial value of an extraction condition for extracting a defect of the inspection target, from a memory;
  a defect determining step of extracting, via the processor, defects of the inspection target by comparing the feature amount with the extraction condition;
  an output step of outputting, via the processor, information indicating the defect extracted in the defect determining step;
  a defect class designating step of designating, via the processor, in which defect class of true defects and false defects the defect extracted in the defect determining step is;
  a designated number insufficiency determining step of determining, using the feature amount calculated in the feature amount calculating step, via the processor, whether or not the designated number of true defects and false defects extracted in a predetermined region in the defect determining step is less than a predetermined threshold; and
  a feature amount totalizing step of performing totalization, via the processor, by adding the feature amount of the defect that corresponds to the defect class extracted in a region other than the predetermined region to the feature amount of the defect extracted in the predetermined region when it is determined that the designated number is less than the predetermined threshold in the designated number insufficiency determining step.

6. The defect inspection method according to claim 5, further comprising:
  a display step of collectively displaying, via a display, the feature amounts of the defects extracted in the predetermined region and the feature amounts of the defects extracted in a region other than the predetermined region, which are totalized in the feature amount totalizing step in order to adjust an extraction condition for extracting the defect.

7. The defect inspection method according to claim 6, wherein
  in the defect determining step, defects are extracted, via the processor, by using different extraction conditions for each of the divided partial regions of the inspection target,
  in the feature amount totalizing step, the feature amounts of the defects extracted in a partial region designated in the inspection target are totalized, via the processor, as the feature amounts of the defects of the inspection target, and the feature amounts of the defects extracted in a region other than the designated partial region in the inspection target are totalized as the feature amounts of the defects extracted in a region other than the partial region, and
  in the display step, extraction condition data in the designated partial region, an expected detection number of true defects and an expected detection number of false defects which are expected to be detected in the designated partial region, and an expected detection number of true defects or false defects which is not extracted in the designated partial region are displayed, via the display.

8. The defect inspection method according to claim 6, wherein
  in the defect determining step, defects are extracted, via the processor, by using different extraction conditions for each of the divided partial regions of the inspection target,
  in the feature amount totalizing step, the feature amounts of the defects extracted in a partial region designated in the inspection target are totalized, via the processor, as the feature amounts of the defects of the inspection target, and the feature amounts of the defects other than the defects extracted in the designated region of the inspection target are totalized as the feature amounts of the defects which are not extracted in the designated partial region, and in the display step, extraction condition data in the designated partial region, an expected detection number of true defects and an expected detection number of false defects which are expected to be detected in the designated region, and an expected detection number of true defects or false defects which is not extracted in the designated partial region are displayed, via the display.

9. The defect inspection method according to claim 6, wherein in the feature amount calculating step, the feature amounts of a reference image that corresponds to the region where the defects are extracted are calculated, via the processor, the method further comprises a feature amount storage step of storing the feature amount of the defect including the feature amount of the reference image in the memory, and in the feature amount totalizing step, similarity between the regions is evaluated, via the processor, by comparing distribution of the feature amounts of the reference image in a region which is a target for totalizing the feature amounts with distribution of the feature amounts of the reference image which is acquired in another region and stored in the feature amount storage unit, and the feature amounts are totalized by adding features of different defects stored in the feature amount storage unit when it is determined that the distributions are similar.

* * * * *